(12) United States Patent
Honkura et al.

(10) Patent No.: US 7,219,549 B2
(45) Date of Patent: May 22, 2007

(54) ACCELEROMETER WITH CANTILEVER AND MAGNETIC FIELD DETECTOR

(75) Inventors: Yoshinobu Honkura, Tokai (JP); Michiharu Yamamoto, Tokai (JP); Yoshiaki Koutani, Tokai (JP); Masaki Mori, Tokai (JP); Eiji Kako, Tokai (JP); Kouei Genba, Tokai (JP); Takumi Asano, Tokai (JP); Naoki Ishikawa, Tokai (JP)

(73) Assignee: Aichi Steel Corporation, Tokai-shi (JP)

( * ) Notice: Subject to any disclaimer, the term of this patent is extended or adjusted under 35 U.S.C. 154(b) by 0 days.

(21) Appl. No.: 11/084,818

(22) Filed: Mar. 21, 2005

(65) Prior Publication Data

US 2006/0123906 A1 Jun. 15, 2006

(30) Foreign Application Priority Data

| Apr. 30, 2004 | (JP) | ............................. 2004-135082 |
| Sep. 29, 2004 | (JP) | ............................. 2004-283700 |
| Dec. 9, 2004 | (JP) | ............................. 2004-356999 |

(51) Int. Cl.
*G01P 15/08* (2006.01)

(52) U.S. Cl. .................................. 73/514.31

(58) Field of Classification Search ............. 73/514.16, 73/514.31, 514.01, 514.02, 514.15, 514.29, 73/514.35

See application file for complete search history.

(56) References Cited

U.S. PATENT DOCUMENTS

| 4,212,041 | A |   | 7/1980  | Lazzari et al. |
| 4,603,365 | A |   | 7/1986  | Nakamura |
| 4,825,697 | A | * | 5/1989  | Huber ...................... 73/514.14 |
| 4,849,655 | A | * | 7/1989  | Bennett .................. 73/514.31 |
| 4,967,598 | A | * | 11/1990 | Wakatsuki et al. ....... 73/514.12 |
| 5,027,657 | A | * | 7/1991  | Juckenack et al. ....... 73/514.13 |

(Continued)

FOREIGN PATENT DOCUMENTS

EP 0 251 069 A1 1/1988

(Continued)

OTHER PUBLICATIONS

Yoshinobu Honkura, "Development of amorphous wire type MI sensors for automobile use", Journal of Magnetim and Magnetic Materials, vol. 249, No. 1-2, Aug. 2002, pp. 375-381.

(Continued)

*Primary Examiner*—Helen Kwok
(74) *Attorney, Agent, or Firm*—Oblon, Spivak, McClelland, Maier & Neustadt, P.C.

(57) ABSTRACT

An accelerometer for measuring the displacement of a magnet body using magnetic detecting elements is provided, the accelerometer having superior measurement accuracy by suppressing influence of a peripheral magnetic field. The accelerometer has detecting units each having a cantilever which is elastically deformed so as to rotate around a fixed end thereof, a magnet body provided at a free end of the cantilever, and a magnetic detecting head portion disposed outside the rotation region of the cantilever. In order to correct detection signals output from the magnetic detecting head portions, the accelerometer has peripheral magnetic field detecting portions for measuring a peripheral magnetic field acting on the magnetic detecting head portions and the magnet bodies.

19 Claims, 30 Drawing Sheets

U.S. PATENT DOCUMENTS

| | | | |
|---|---|---|---|
| 5,036,705 A * | 8/1991 | Gaines | 73/514.14 |
| 5,694,041 A | 12/1997 | Lescourret | |
| 6,311,557 B1 * | 11/2001 | Davis et al. | 73/514.31 |
| 6,698,295 B1 | 3/2004 | Sherrer | |
| 6,771,449 B1 | 8/2004 | Ito et al. | |

FOREIGN PATENT DOCUMENTS

| | | |
|---|---|---|
| EP | 0 431 807 A1 | 6/1991 |
| JP | 2000-258449 | 9/2000 |
| JP | 2003-315431 | 11/2003 |
| JP | 2004-119517 | 4/2004 |
| WO | WO 89/10570 | 11/1989 |

OTHER PUBLICATIONS

K. Takashima, et al., "Fracture behaviour of micro-sized specimens prepared from an amorphous alloy thin film at ambient and elevated temperature", Mat. Res. Soc. Symp. Proc., vol. 695, No. L8.4, 2002, pp. 1-6.

Shigeaki Kobayashi, et al., "Grain growth and mechanical properties of electrodeposited nanocrystalline nickel-4.4mass% phosphorus alloy", Materials Science and Engineering, vol. 358, No. 1-2, Oct. 15, 2003, pp. 76-83.

* cited by examiner

FIG. 7
(a)
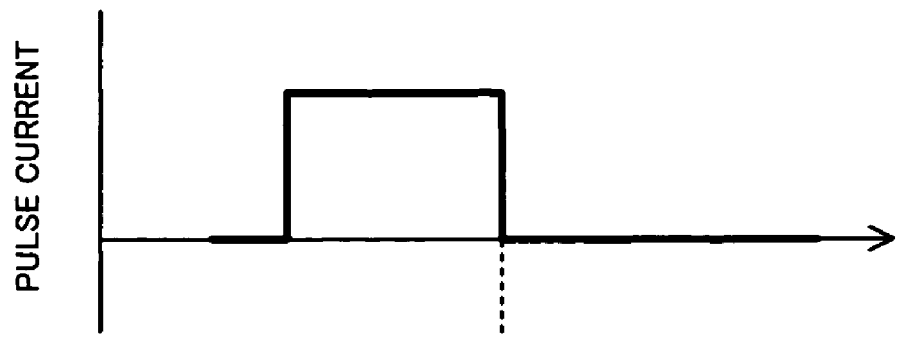
(b)
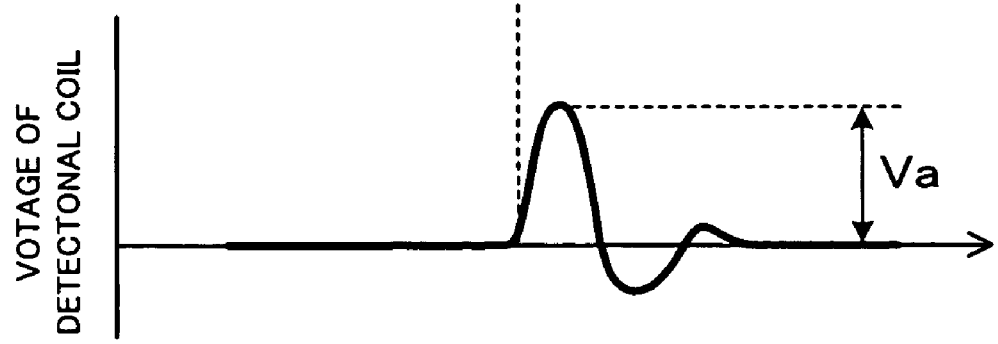

ACCELEROMETER WITH CANTILEVER AND MAGNETIC FIELD DETECTOR

BACKGROUND OF THE INVENTION

1. Technical Field

The present invention relates to an accelerometer using magnetic sensors.

2. Background Art

Heretofore, as an accelerometer, for example, there may be mentioned a device formed of a magnet body to be displaced in accordance with acting acceleration and a magnetic sensor detecting the change in magnetic field generated by the above magnet body. This accelerometer measures the amount of displacement of the magnet body based on the change in magnetic field, that is, measures the magnitude of acting acceleration (see, e.g., see Patent Document 1).

Patent Document 1; Japanese Unexamined Patent Application Publication No. 2000-258449

However, according to the related accelerometer described above, the following problem may arise. That is, in the related accelerometer described above, when a peripheral magnetic field, such as earth magnetism, is applied to the magnet body, this magnet body may behave as a compass and be displaced regardless of acting acceleration in some cases. In particular, a compact accelerometer formed in combination of a small magnet body and a low elastic cantilever may frequently cause the problem described above.

SUMMARY OF THE INVENTION

The present invention was made in consideration of the problem described above, and an object of the present invention is to provide an accelerometer for measuring the displacement of a magnet body using a magnetic sensor, in which the accuracy of the accelerometer is improved by suppressing influence of a peripheral magnetic field.

In accordance with a first aspect of the present invention, there is provided an accelerometer comprising: a substrate, at least one detecting unit, and at least one peripheral magnetic field detecting portion. The detecting unit has a support member erected on the substrate, a cantilever which is elastically deformed to rotate around a fixed end thereof fixed by the support member, a magnet body provided at a free end of the cantilever, and a magnetic detecting head portion provided outside the rotation region of the cantilever. In addition, in order to correct a detection signal output from the magnetic detecting head portion, the peripheral magnetic field detecting portion measures a peripheral magnetic field applied to the magnetic detecting head portion and the magnet body.

The peripheral magnetic field detecting portion of the accelerometer of the present invention measures a peripheral magnetic field applied to the magnetic detecting head portion and the magnet body provided on the cantilever. By this peripheral magnetic field detecting portion, the peripheral magnetic field directly applied to the magnetic detecting head portion can be detected. Hence, by the peripheral magnetic field detecting portion, of the detection signal output from the magnetic detecting head portion, an error component generated by the application of the peripheral magnetic field can be corrected.

Furthermore, by the peripheral magnetic field detecting portion, the peripheral magnetic field applied to the magnet body to generate a torque therein and to elastically deform the cantilever can be detected. When this peripheral magnetic field is detected, regardless of acceleration acting on the accelerometer described above, the amount of displacement of the magnet body caused by the influence of the peripheral magnetic field can be estimated. In addition, of the detection signal output from the magnetic detecting head portion, an error component resulting from the displacement of the magnet body caused by the torque can be estimated. Hence, of the detection signal output from the magnetic detecting head portion, an error component generated by the indirect influence of the peripheral magnetic field via the displacement of the magnet body can be corrected.

As described above, according to the accelerometer of the present invention, of the detection signal output from the magnetic detecting head portion, the error component by the direct influence of the peripheral magnetic field and the error component by the indirect influence thereof can be corrected, and hence the acting acceleration can be accurately measured.

The torque generated in the magnet body described above is a rotational force generated when a magnetic field is applied to the magnet body which has a magnetic moment in a predetermined direction. This magnetic moment is the product of the magnetic pole intensity of the magnet body and the distance between the magnetic poles and has directionality. In addition, for example, the torque is similar to a rotational force for rotating a compass needle and has directionality depending on the orientation of the magnetic moment.

In accordance with a second aspect of the present invention, there is provided an acceleration sensing part comprising: a cantilever which is elastically deformed so as to rotate around a fixed end thereof; a magnet body provided at a free end of the cantilever; and a support member fixing and supporting the fixed end of the cantilever, in which acting acceleration is converted into the change in magnetic field caused by displacement of a magnet body. In this acceleration sensing part, the support member has a base portion bonded to the fixed end and an extending portion extending from the base portion to the free end side of the cantilever, and a space is provided between the cantilever and the extending portion.

As described above, the above acceleration sensing part converts acting acceleration into the change in magnetic field caused by the displacement of the magnet body. That is, the acceleration acting on the acceleration sensing part described above acts on the free end of the cantilever to which the magnet body is fixed. Accordingly, as the cantilever is elastically deformed and the free end thereof is displaced, the magnet body is displaced, and as a result, a magnetic field generated from the magnet body is changed. Hence, when being converted into the change in magnetic field, the acceleration can be sensed.

When the change in magnetic field described above is detected by magnetic detecting means, the acceleration can be detected.

In an acceleration sensing part, in order to improve the sensing sensitivity, the rigidity of the cantilever is decreased as much as possible so that the deformation can be more easily obtained. Accordingly, when the acceleration sensing part is handled, the cantilever which is easily deformed and the magnet body fixed to the free end of the cantilever must be prevented from being touched.

Hence, in the acceleration sensing part of the present invention, the support member is composed of the base portion and the extending portion. By this structure, while the cantilever and the magnet body are prevented from being touched, the support member can be easily held, and hence the handling of the acceleration sensing part becomes easier. For example, when the acceleration sensing part is mounted onto a substrate or the like, the handling can be easily performed.

In addition, as a result, an acceleration sensing part having superior sensing accuracy can be obtained.

Furthermore, since being formed to extend to the free end side of the cantilever, the extending portion will not prevent miniaturization of the acceleration sensing part.

BRIEF DESCRIPTION OF THE DRAWINGS

FIG. 7 is a graph showing the relationship between a pulse current supplied to an amorphous wire and an inductive voltage generated in an electromagnetic coil, according to Embodiment 1;

DESCRIPTION OF THE PREFERRED EMBODIMENTS

Figure 1:
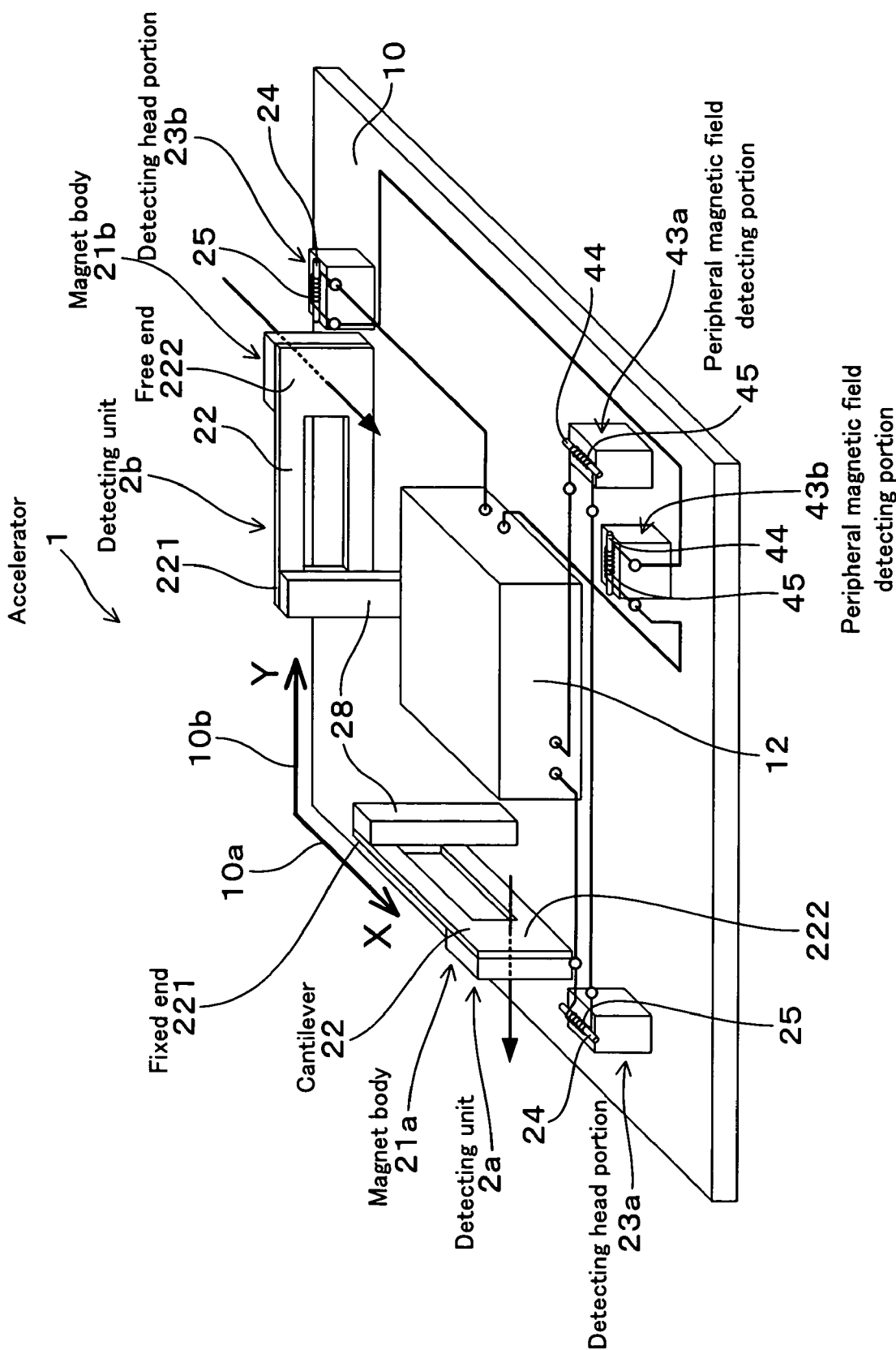
FIG. 1 is a perspective view of an accelerometer according to Embodiment 1.

The accelerometer according to the first aspect of the present invention may be widely used, for example, for measuring motion information of automobiles and autonomous mobile robots and for controlling manipulators of robot arms of stationary robots and the like. Furthermore, the accelerometer described above may be mounted on a portable device such as a personal digital assistant (PDA) or a mobile phone. In particular, in the case of a PDA or a mobile phone having a highly integrated electrical circuit, adverse influences caused by electromagnetic noises may become serious in some cases, the accelerometer of the present invention becomes particularly advantageous.

In addition, the magnetic detecting head portion of the present invention may be formed using a magnetic sensing element such as a hall element, a magnetic impedance element, a magnetoresistance element, or a flux gate element. Furthermore, the magnet body described above may be formed using ferrite, a rare earth magnet, or the like.

As acceleration measured by the accelerometer of the present invention, in addition to movement acceleration, gravitational acceleration may also be mentioned.

In addition, a sensing direction of the peripheral magnetic field detecting portion in which magnetic detection sensitivity is maximum is preferably parallel to a sensing direction of the magnetic detecting head portion in which magnetic detection sensitivity is maximum.

In this case, a peripheral magnetic field component applied to the magnetic detecting head portion can be accurately detected using the peripheral magnetic field detecting portion. In addition, the amount of elastic deformation of the cantilever caused by a torque, which is generated in the magnet body due to the application of the peripheral magnetic field, and the amount of displacement of the magnet body caused by the elastic deformation described above can be accurately calculated.

The two sensing directions described above may be substantially parallel to each other, and as long as the operational effect described above can be satisfactorily obtained, the directions described above may be in a state which is slightly deviated from a strictly parallel state. For the same reason as described above, in the present invention, terms such as "parallel", "orthogonal", "uniform", and "proportional" represent "substantially parallel", "substantially orthogonal", "substantially uniform", and "substantially proportional", respectively, and are not intended to represent only the strict parallel state and the like.

In addition, in the accelerometer described above, the magnetic detecting head portion and the peripheral magnetic field detecting portion each preferably comprise a magnetic sensing member and an electromagnetic coil coiled around the periphery of the magnetic sensing member to form a magneto-impedance (MI) element which generates a potential difference between the two ends of the electromagnetic coil in accordance with the change in current supplied to the magnetic sensing member.

In this case, a phenomenon in which an inductive voltage is generated in the electromagnetic coil in accordance with the change in current supplied to the magnetic sensing member is called a MI effect. This MI effect is generated in a magnetic sensing member having electron spin orientation in a circumferential direction with respect to the direction of a supply current. When a current supplied to the magnetic sensing member is rapidly changed, a magnetic field in a circumferential direction is rapidly changed, and by the influence of the change in magnetic field, the direction of electron spin is changed in accordance with a peripheral magnetic field. Hence, a phenomenon in which the internal magnetization, impedance, or the like of the magnetic sensing member is changed by the change in electron spin direction is the MI effect.

In addition, the MI element is an element using a magnetic sensing member formed of a magnetic material having electron spin orientation in a circumferential direction with respect to the direction of a supply current. When the current supplied to the magnetic sensing member is rapidly changed, a magnetic field in the circumferential direction is rapidly changed, and by this change in magnetic field, the change in electron spin direction occurs in accordance with the peripheral magnetic field. Accordingly, an element is formed so that the change in internal magnetization, impedance, or the like of the magnetic sensing member described above is converted, for example, into a voltage or a current generated in the magnetic sensing member or a voltage or a current generated between two ends of an electromagnetic coil disposed around the periphery of the magnetic sensing member, thereby obtaining the MI element. For example, when this MI element is combined with an electronic circuit, a so-called MI sensor is obtained.

When the magnetic detecting head portion described above is formed using an MI element in which a potential difference is generated between two ends of an electromagnetic coil in accordance with the change in current supplied to a magnetic sensing member as described above, highly sensitive magnetic detection can be performed, and the displacement of the magnet body can be accurately detected. As the magnetic sensing member described above, for example, a wire-shaped or a thin-film member may be used. In addition, as a material for the magnetic sensing member, for example, FeCoSiB and NiFe may be mentioned.

In addition, the magnetic detecting head portion and the peripheral magnetic field detecting portion are each preferably formed to measure the intensity of an acting magnetic field by measuring an inductive voltage generated between the two ends of the electromagnetic coil when a current supplied to the magnetic sensing member is rapidly increased or decreased within 10 nanoseconds.

In this case, by the rapid change in supply current as described above, in the magnetic sensing member described above, the change in magnetic field in the circumferential direction can be generated at a speed approximately equivalent to a propagation speed of the change in electron spin direction, and hence a sufficient MI effect can be obtained.

In particular, when the supply current is rapidly increased or decreased within 10 nanoseconds, the change in current containing a high frequency component of approximately 0.1 GHz is allowed to act on the magnetic sensing member. Subsequently, when the inductive voltage generated between the two ends of the electromagnetic coil described above is measured, the change in internal magnetic field generated in the magnetic sensing member in accordance with the peripheral magnetic field can be measured as the inductive voltage, and in addition, the intensity of the peripheral magnetic field can be more accurately measured. In this case, the rapid increase of a supply current and the rapid decrease thereof indicate increase and decrease in current supplied to the above magnetic impedance element from 10% (90%) to 90% (10%) of a steady-state current, respectively.

As times for rapid increase and decrease of the supply current are closer to zero, better results can be obtained. Hence, a practical lower limit of the time for the rapid increase and decrease is determined, for example, by the limitation of an apparatus or the like generating the supply current.

The magnetic detecting head portion and the peripheral magnetic field detecting portion are each preferably formed to measure the inductive voltage generated between the two ends of the electromagnetic coil when the current supplied to the magnetic sensing member is rapidly decreased.

Compared to the case in which the supply current is rapidly increased, when the supply current is rapidly decreased, the linearity of an output voltage from the magnetic detecting head portion with respect to the intensity of the magnetic field becomes superior.

In the accelerometer described above, the number of said at least one detecting unit is preferably two so as to detect acceleration acting along two axis directions orthogonally intersecting each other.

In this case, when the accelerometer described above is used, acceleration acting in an optional direction along a plane defined by the above two axes can be measured.

In the accelerometer described above, the number of said at least one detecting unit is preferably three so as to detect acceleration acting along three axis directions orthogonally intersecting each other.

In this case, when the accelerometer described above is used, acceleration acting in an optional direction can be measured.

In addition, the accelerometer described above may further comprise an electrical circuit for controlling the magnetic detecting head portion and the peripheral magnetic field detecting portion.

In this case, the accelerometer including the above electrical circuit can be miniaturized, and in addition, when the electrical circuit is modularized, the electrical power consumption of the accelerometer can be reduced.

In the accelerometer described above, the above electrical circuit is preferably formed to receive a detection signal of the magnetic detecting head portion and a detection signal of the peripheral magnetic field detecting portion provided corresponding thereto so as to perform signal processing.

In this case, by performing signal processing of the detection signal of the magnetic detecting head portion and the detection signal of the peripheral magnetic field detecting portion, of the detection signal of the magnetic detecting head portion, error components by direct or indirect influence of the peripheral magnetic field can be corrected.

As a method of the signal processing described above, for example, a method may be mentioned in which a detection signal of the magnetic detecting head portion and a detection signal of the peripheral magnetic field detecting portion are received in parallel and are then processed. In this case, based on the detection signal of the peripheral magnetic field detecting portion, the error component of the detection signal of the magnetic detecting head portion can be estimated. Hence, when the detection signal of the peripheral magnetic field detecting portion is used, the correction can be made so as to improve the measurement accuracy of the accelerometer described above.

Furthermore, for example, a method may also be mentioned in which the magnetic detecting head portion and the peripheral magnetic field detecting portion are formed so as to output detection signals having opposite signs (positive and negative) to each other when the same peripheral magnetic field is applied thereto and are connected to each other in series. In this case, when the ratio of the intensity of the detection signal of the peripheral magnetic field detecting portion to that of the magnetic detecting head portion is appropriately determined, a signal excluding the error component from the detection signal of the magnetic detecting head portion can be obtained. In addition, for example, after the detection signal of the peripheral magnetic field detecting portion is amplified, the peripheral magnetic field detecting portion may be connected to the magnetic detecting head portion in series.

In addition, the accelerometer described above is preferably modularized.

In this case, when the accelerometer is modularized, the rigidity thereof can be increased, and the measurement accuracy of the accelerometer can be improved. In particular, when an accelerometer containing a plurality of the detecting units is modularized, the relationship between the detecting units can be made similar to a rigid body. Hence, the accelerometer has higher measurement accuracy. In particular, when modularization is performed including the electrical circuit, the electrical power consumption of the accelerometer thus modularized can be reduced.

In the accelerometer described above, the detecting unit may further comprise at least one stopper provided in the rotation direction of the free end of the cantilever in order to prevent excessive displacement thereof.

In this case, even when an intensive impact is applied to the accelerometer so that a large force is applied to the cantilever, since the free end of the cantilever is brought into contact with the stopper, unnecessary displacement (excessive displacement) of the free end can be prevented. Hence, deformation and damage of the cantilever can be prevented.

In addition, the stopper may be provided at one side of the rotation direction of the free end of the cantilever or may be provided at both sides thereof.

In addition, the stopper is preferably integrated with the support member described above.

In this case, since the number of parts forming the accelerometer can be decreased, easy assembly properties and reduction in cost can be advantageously obtained.

The acceleration sensing part in accordance with the second aspect of the present invention, which is described above, may be applied to the above accelerometer according to the first aspect of the present invention.

In this case, in addition to easy assembly of the accelerometer described above, an accelerometer having high accuracy can be obtained.

That is, since the accelerometer according to the first aspect of the present invention is formed to improve the measurement accuracy by suppressing the influence of a peripheral magnetic field as described above, an acceleration sensing part to be used also must have a high sensing sensitivity. In this case, a cantilever which is likely to be deformed is used, and hence in handling thereof, the probability of the cantilever and the magnet body to be being touched must be made as small as possible. Accordingly, when the acceleration sensing part according to the second aspect of the present invention is used, the problem described above, which may frequently occur in handling an acceleration sensing part having a high sensing sensitivity, can be easily solved.

In addition, the length of the support member is preferably larger than that of the cantilever. In this case, when the two ends of the support member in the longitudinal direction are held, the cantilever can be easily prevented from being touched.

In addition, it is preferable that the cantilever described above is a conductor, that the support member have a conductive layer on a surface of the extending portion facing the cantilever, and that the conductive layer be electrically connected to the cantilever.

In this case, the surface of the extending portion of the support member facing the cantilever can be prevented from being electrostatically charged, and hence the displacement of the cantilever caused by an electrostatic force can be prevented. Accordingly, an error caused by electrostatic charges can be prevented, and as a result, an accelerometer having a high accuracy can be obtained.

For example, when the support member is made of an insulating material, and when the conductive layer is not provided thereon, electrostatic charges may be generated on the facing surface of the cantilever and that of the extending portion of the support member so as to attract each other in some cases. Hence, when a conductive layer electrically connected to the cantilever is formed on the facing surface of the extending portion of the support member, the cantilever and the facing surface of the extending portion of the support member have the same potential, and as a result, the generation of electrostatic charges can be prevented.

In addition, the conductive layer is preferably connected to the ground of the electrical circuit formed on the substrate.

Furthermore, the conductive layer is preferably formed on the entire facing surface; however, even when being provided on part thereof, the effect described above can also be obtained.

In addition, the cantilever preferably comprises a Ni—P alloy.

In this case, a cantilever can be formed having superior spring properties, such as a low elastic modulus, a wide elastic deformation region, and a high breaking strength. Accordingly, the amount of displacement of the cantilever caused by the same acceleration is increased, and as a result, the sensitivity of the acceleration sensing part is improved. In addition, a cantilever having a high detecting accuracy of acceleration and superior durability can be obtained.

In addition, the support member preferably comprises a ceramic, and the acceleration sensing part may further comprise a multiple metal-layer having a plurality of metal layers between the support member and the fixed end of the cantilever.

In this case, when appropriate types of metals are selected for the plurality of metal layers, adhesion between the support member and the cantilever can be improved.

In addition, it is preferable that the multiple metal-layer have a first metal layer provided adjacent to the support member and a second metal layer provided adjacent to the cantilever, that the first metal layer comprise at least one of Ti, Cr, and Al, and that the second metal layer comprise at least one of Cu, Au, and Ag.

In this case, the bonding between the first metal layer and the support member and that between the second metal layer and the cantilever are ensured, and as a result, the adhesion between the support member and the cantilever can be further improved.

In addition, the magnet body preferably comprises a resin magnet or comprises a magnet and a resin layer which is to be bonded to the cantilever, and the acceleration sensing part may further comprise a metal layer forming a stable passive film to be bonded to the magnet body.

In this case, since the passivation film and the resin have good affinity to each other, the adhesion between the cantilever and the magnet body can be improved.

That is, since having reactive functional groups such as an oxygen-containing group and a hydroxyl group on the surface, the passivation film has good affinity to the resin. In addition, on a stable passivation film, the reactive functional groups such as an oxygen-containing group and a hydroxyl group are uniformly present, and hence the affinity to the resin is further improved. As described above, by increasing a chemical bonding force between the Ni—P alloy and the resin, the bonding between the cantilever and the magnet body can be improved.

In addition, for example, when the magnet body described above is a sintered magnet, a resin layer is provided on the surface thereof so as to be bonded to the cantilever as described above.

In addition, the metal layer preferably comprises at least one of Cr, Al, Zn, and Ti.

In this case, a particularly stable passivation film can be formed.

EMBODIMENT

Embodiment 1

In this embodiment, an accelerometer 1 will be described which uses an amorphous wire as a magnetic sensing member 24. The structure will be described with reference to FIGS. 1 to 8.

As shown in FIG. 1, the accelerator 1 of this embodiment includes detecting unit 2a (2b) having a cantilever 22 to be elastically deformed so as to rotate around a fixed end 221 thereof, a magnet body 21a (21b) provided at a free end 222 of the cantilever 22, and a magnetic detecting head portion 23a (23b) disposed outside the rotation region of the cantilever 22.

In order to correct detection signals output from the magnetic detecting head portions 23a and 23b, this accelerometer 1 has peripheral magnetic field detecting portions 43a and 43b for measuring a peripheral magnetic field applied to the magnetic detecting head portions 23a and 23b and magnet bodies 21a and 21b.

Hereinafter, the structure will be further described in detail.

As shown in FIG. 1, the accelerometer 1 of this embodiment has the two detecting units 2a and 2b formed in combination of the cantilevers 22 and the magnetic detecting head portions 23a and 23b, the two peripheral magnetic field detecting portions 43a and 43b, and an IC chip 12 containing an electrical circuit functioning as a control circuit on a common IC substrate 10, and the components described above are integrated to produce a modularized form.

In this accelerometer 1, the magnitude of an inertial force applied to the cantilever 22 in accordance with acting acceleration is converted into the amount of displacement of the magnet body 21a (21b) disposed at the free end 222. Subsequently, by the use of the magnetic detecting head portion 23a (23b), the amount of displacement of the magnet body 21a (21b) is detected, thereby measuring the magnitude of the acting acceleration. In this embodiment, the structure is formed so as to detect acceleration acting along an X axis 10a direction and that along a Y axis 10b direction in accordance with the amounts of displacement of the magnet bodies 21b and 21a of the detecting units 2b and 2a, the X axis 10a and the Y axis 10b directions being defined along two orthogonal sides of the IC substrate 10.

As shown in FIG. 1, the cantilever 22 is formed of an elastic body having a cantilever shape and is supported at the fixed end 221 thereof, which is one end in the axis direction, by a support post 28 erected on the surface of the IC substrate 10. In addition, the magnet body 21a (21b) is provided at the free end 222 which is the other end of the cantilever 22 opposite to the side supported by the support post 28. The cantilever 22 of this embodiment is formed of NiP and has an approximately rectangular shape having a width of 0.3 mm, a length of 1.5 mm, and a thickness of 5 μm. Furthermore, in this embodiment, in order to magnify the amount of displacement of the magnet body 21, while the rigidity against a force in a thickness direction is appropriately reduced, a long hole 220 having a width of 0.22 mm is provided from a foot portion at the support post 28 side to a position of 0.38 mm from the free end 222. Alternatively, without forming the long hole 220, a sheet-shaped cantilever may also be formed.

In this embodiment, the characteristic frequency of the cantilever 22 is set to approximately 50 to 60 Hz. When the characteristic frequency of the cantilever 22 is set in the range of 50 to 60 Hz, for example, an acceleration of 0 to 40 Hz generated by an automobile or the like can be accurately detected. On the other hand, when the characteristic frequency is set to less than 50 Hz, an acceleration of approximately 40 Hz may not be accurately detected in some cases.

The magnet body 21a (21b) is disposed on a side surface of the cantilever 22 in the vicinity of the free end 222 thereof. In this embodiment, a magnetic paint is applied onto the side surface and is magnetized after drying and curing of the paint, thereby forming the magnet body 21. In this embodiment, the magnet body 21 is formed to have a width (the dimension of the cantilever 22 in the axis direction) W of 0.5 mm, a height H of 0.3 mm, and a thickness T of 100 μm.

Figure 2:
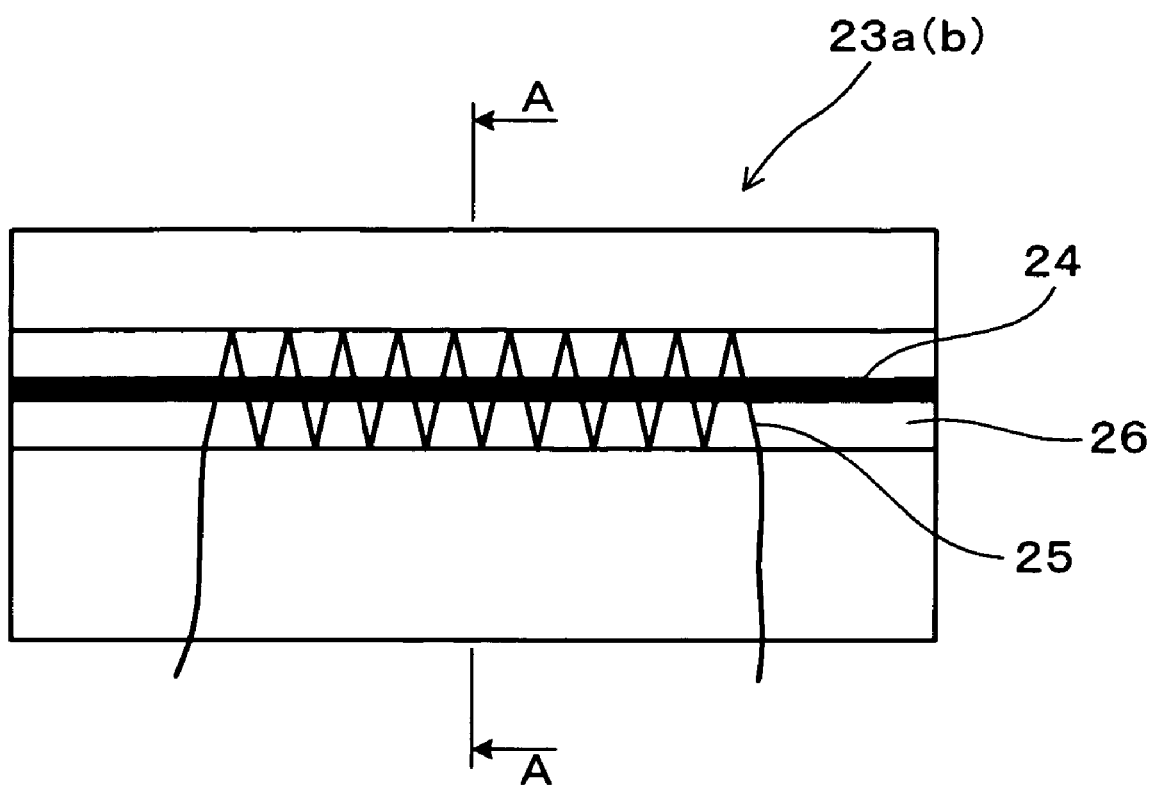
FIG. 2 is a schematic front view of a magnetic detecting head portion according to Embodiment 1.
Figure 3:
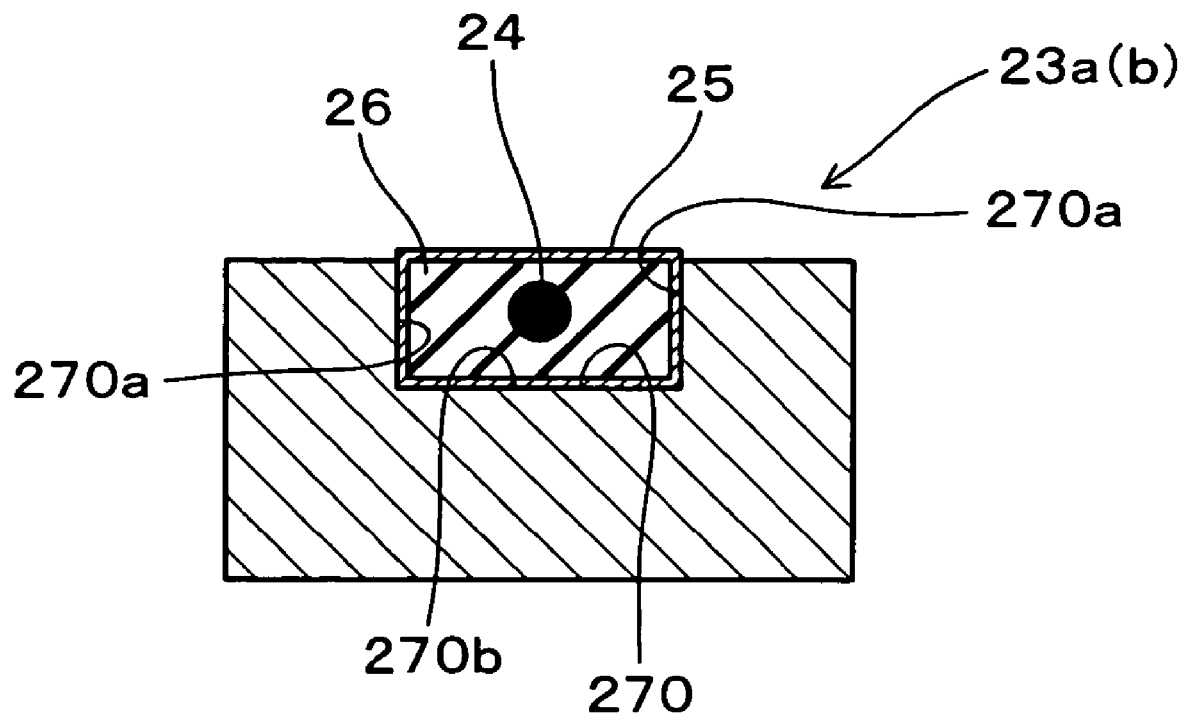
FIG. 3 is a schematic cross-sectional view of a magnetic detecting head portion according to Embodiment 1.

Next, a method for forming the magnetic detecting head portion 23a (23b) will be described, and simultaneously the structure thereof will also be described. As shown in FIGS. 2 and 3, the magnetic detecting head portion 23a (23b) is formed using an amorphous wire (hereinafter referred to as "amorphous wire 24" in some cases) having a length of 1 mm and a diameter of 20 μm as the magnetic sensing member 24. As shown in FIGS. 2 and 3, the magnetic detecting head portion 23a (23b) is formed of the amorphous wire 24, a tube-shaped insulating resin 26 covering the wire 24, and an electromagnetic coil 25 having an internal diameter of 200 μm or less coiled around the periphery of tube-shaped insulating resin 26.

That is, in the magnetic detecting head portion 23a (23b) of this embodiment, the MI effect of the amorphous wire 24 provided as the magnetic sensing member is used in which the impedance is remarkably changed in accordance with the change in intensity of a peripheral magnetic field. In addition, in this embodiment, an inductive voltage is measured which is generated in the electromagnetic coil 25 when a pulse-shaped current (hereinafter simply referred to as "pulse current" in some cases) is supplied to the amorphous wire 24, and hence the intensity of the peripheral magnetic field is detected.

In addition, the MI effect described above is generated in a magnetic sensing member made of a magnetic material having electron spin orientation in a circumferential direction with respect to the direction of a supply current. When a current supplied to the magnetic sensing member is rapidly changed, a magnetic field in a circumferential direction is rapidly changed. That is, the MI effect is a phenomenon in which, by the change in magnetic field in the circumferential direction, the change in electron spin direction in accordance with the peripheral magnetic field occurs, and concomitant with the change described above, the change in internal magnetization, impedance, or the like occurs.

An MI element (in this embodiment, the magnetic detecting head portions 23a and 23b and the peripheral magnetic field detecting portions 43a and 43b are mentioned) using this MI effect is formed so that the change in internal magnetization, impedance, or the like, which is caused by the change in electron spin direction resulting from the rapid change in current supplied to the amorphous wire 24 used as the magnetic sensing member, is converted to a voltage (inductive voltage) generated between the two ends of the electromagnetic coil 25 disposed around the amorphous wire 24. In addition, the individual magnetic detecting head portions 23a and 23b of this embodiment each have magnetic detection sensitivity in the longitudinal direction of the amorphous wire 24 used as the magnetic sensing member.

In this embodiment, in order to decrease the intensity of a magnetic field detected by the magnetic detecting head portion 23a (23b) when acceleration is not present and the magnet body 21a (21b) is not displaced, as shown in FIG. 1, the amorphous wire 24 is disposed orthogonal to the magnetization direction generated by the magnet body 21a (21b). Alternatively, the amorphous wire 24 may be disposed oblique to the magnetization direction described above. However, in this case, even when the magnet body 21a (21b) is not displaced, the intensity of a magnetic field detected by the magnetic detecting head portion 23a (23b) is not always minimum, and hence signal processing must be optionally performed.

Figure 4:
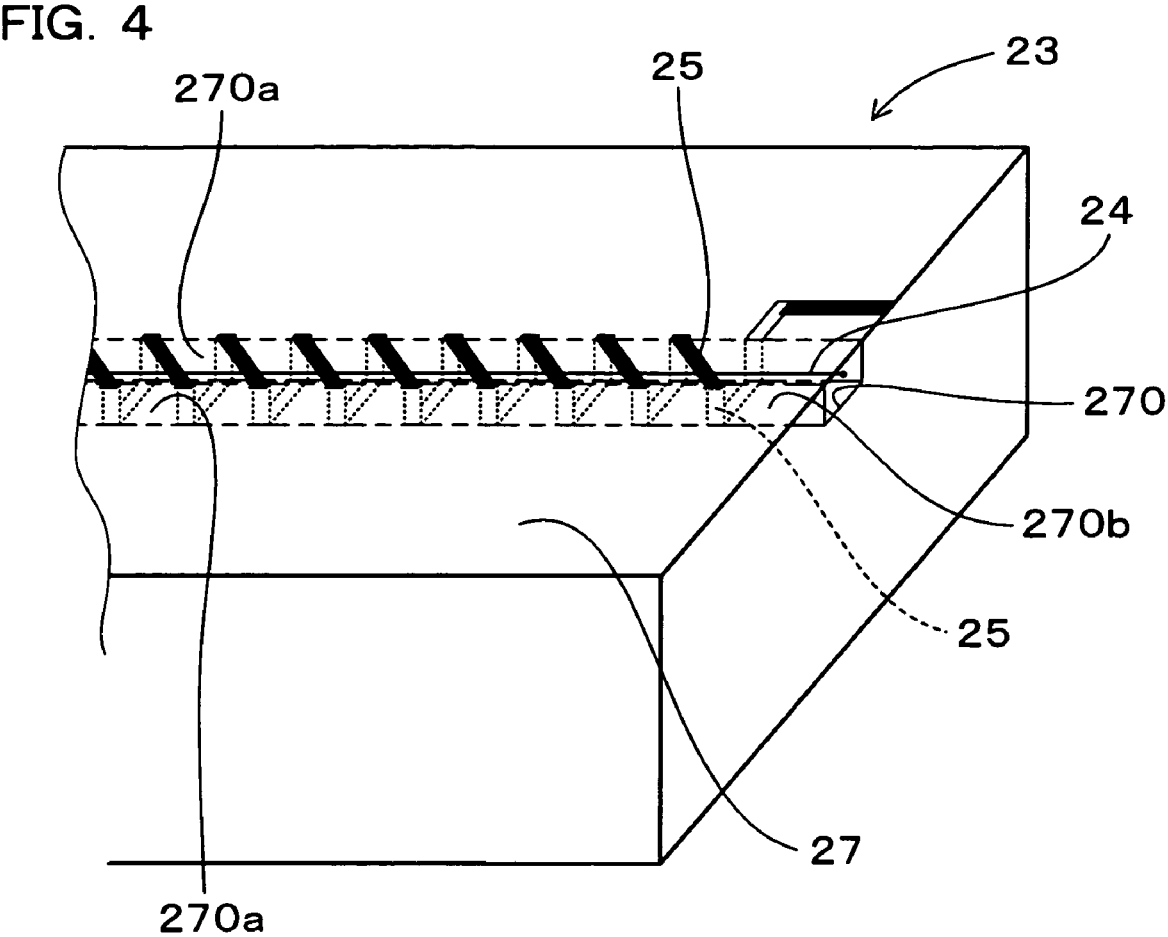
FIG. 4 is a perspective view for illustrating a magnetic detecting head portion according to Embodiment 1.
Figure 5:
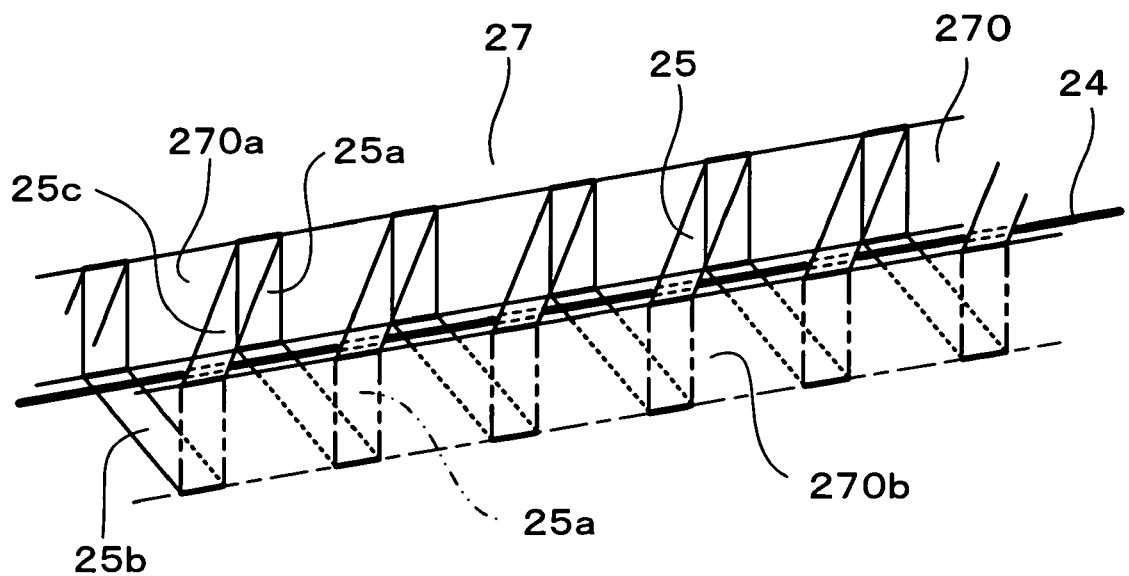
FIG. 5 is a perspective view for illustrating a magnetic coil according to Embodiment 1.

As shown in FIGS. 4 and 5, this magnetic detecting head portion 23a (23b) is formed on an element substrate 27 provided with a groove 270 having a depth of 5 to 200 µm and having an approximately rectangular cross-section. On side surfaces 270a of the groove 270 facing each other, conductive patterns 25a are provided at regular intervals perpendicularly to the groove extending direction. In addition, on bottom surface 270b of the grove 270, conductive patterns 25b are provided at regular intervals perpendicularly to the groove extending direction so as to electrically connect the conductive patterns 25a provided at regular intervals on the two side surfaces 270a to each other.

The groove 270 provided with the conductive patterns 25a and 25b disposed on the side surfaces 270a and the bottom surface 270b, respectively, is filled with an epoxy-based insulating resin 26 (see FIG. 3), and the amorphous wire 24 is buried therein. On the exterior surface of the insulating resin 26 filling the groove 270, conductive patterns 25c are provided obliquely with respect to the groove extending direction so that conductive patterns 25a are electrically connected to respective conductive patterns 25a adjacent thereto as shown in FIG. 4. As a result, the conductive patterns 25a, 25b, and 25c collectively form the spiral electromagnetic coil 25.

In this embodiment, on the entire interior surfaces 270a and 270b of the grove 270, a conductive metal thin film (not shown in the figure) is deposited and is then processed by etching treatment, thereby forming the conductive patterns 25a and 25b. In addition, as for the conductive patterns 25c, on the entire exterior surface of the insulating resin 26, a conductive metal thin film (not shown in the figure) is deposited and is then processed by etching treatment, thereby forming a desired pattern.

A wiring inside diameter of the electromagnetic coil 25 of this embodiment is set to 66 µm which corresponds to an inside diameter of a circle having the same cross-sectional area as that of the groove 270 (see FIG. 3). In addition, the coiling pitch per unit length of the electromagnetic coil 25 is set to 50 µm/turn. In this embodiment, the magnetic detecting head portions 23 of the detecting units 2a and 2b described above have the exactly same specification, and the longitudinal directions of the amorphous wires 24 of the detecting units 2a and 2b are disposed in the X axis 10a direction and the Y axis 10b direction, respectively.

Next, the peripheral magnetic field detecting portion 43a (43b) (see FIG. 1) are formed as is the magnetic detecting head portion 23a (23b). That is, the peripheral magnetic field detecting portions 43a and 43b each have an amorphous wire 44 used as a magnetic sensing member and an electromagnetic coil 45 coiled around the periphery thereof. However, in this embodiment, the ratio of the intensity of a detection signal of the peripheral magnetic field detecting portion 43a (43b) in a uniform peripheral magnetic field to that of the magnetic detecting head portion 23a (23b) is set to a predetermined value. In this embodiment, the peripheral magnetic field detecting portion 43a has the same magnetic field detecting direction as that of the magnetic detecting head portion 23a. In addition, the peripheral magnetic field detecting portion 43b has the same magnetic field detecting direction as that of the magnetic detecting head portion 23b.

Next, the relationship between an output voltage Vs (an inductive voltage generated between the two ends of the electromagnetic coil 45), which is an output signal of the peripheral magnetic field detecting portion 43a (43b) of this embodiment, and an output voltage Vh (an inductive voltage generated between the two ends of the electromagnetic coil 25), which is an output signal of the magnetic detecting head portion 23a (23b), will be described.

First, the output voltage Vh of the magnetic detecting head portion 23a (23b) is composed of a voltage component Va of acting acceleration, a voltage component Vm detecting a peripheral magnetic field such as earth magnetism, and a voltage component Vt resulting from the displacement of the magnet body 21a (21b) by a torque generated through the peripheral magnetic field. This voltage component Vt is a voltage component generated by the displacement of the magnet body 21a (21b) itself, that is, the torque generated in the magnet body 21a (21b) elastically deforms the cantilever 22. Accordingly, the voltage components Vm and Vt are error components of the output voltage Vh of the magnetic detecting head portion 23a (23b).

The magnitude of the torque generated in the magnet body 21a (21b) by the influence of the peripheral magnetic field is proportional to the intensity of the magnetic field. In addition, the amount of elastic deformation of the cantilever 22 holding the magnet body 21a (21b) is proportional to the magnitude of the torque. Hence, the voltage component Vt is proportional to the intensity of the peripheral magnetic field and can be represented by an equation of the form Vt=k×Vm (k is a unique constant determined, for example, by the cantilever 22 and/or the magnetism of the magnet body 21a (21b)).

Accordingly, the output voltage Vh of the magnetic detecting head portion 23a (23b) can be represented by the form of Va+Vm+Vt=Va+(1+k)·Vm.

In addition, the output voltage Vs of the peripheral magnetic field detecting portion 43a (43b) of this embodiment has an opposite (positive or negative) sign to that of the output voltage Vh described above and is set to (1+k) times the voltage component Vm described above. That is, when being placed in the same peripheral magnetic field, the peripheral magnetic field detecting portion 43a (43b) outputs the output voltage Vs which is represented by an equation of the form Vs=−(1+k)·Vm. Accordingly, the voltage components Vm and Vt, which are the error components, can be removed from the output voltage Vh of the magnetic detecting head portion 23a (23b), and as a result, correction in which the voltage component Va is extracted can be performed. In particular, when the output voltage Vh of the magnetic detecting head portion 23a (23b) and the output voltage Vs of the peripheral magnetic field detecting portion 43a (43b) are added to each other, the voltage component Va of the acting acceleration can be extracted.

In this embodiment, the coiling directions of the electromagnetic coil 25 and the electromagnetic coil 45 are set opposite to each other so that the magnetic detecting head portion 23a (23b) outputs an output voltage having an opposite (positive or negative) sign to that of the peripheral magnetic field detecting portion 43a (43b). Furthermore, by using the properties of an MI element in which the inductive voltage Vs of the electromagnetic coil is increased as the length of the amorphous wire is increased, the length of the amorphous wire 44 is formed long as compared to that of the amorphous wire 24. Accordingly, the magnitude of the output voltage Vs of the peripheral magnetic field detecting portion 43a (43b) is set to (1+k) times the voltage component Vm of the output voltage Vh of the magnetic detecting head portion 23a (23b). As for the rest of the structure described above, the magnetic detecting head portion 23a (23b) has the same specification as that of the peripheral magnetic field detecting portion 43a (43b).

As a method for increasing the magnitude of the output voltage Vs of the electromagnetic coil 45, besides the method of this embodiment for increasing the length of the amorphous wire 44, for example, various methods such as a method for increasing the number of turns of the electromagnetic coil 45 and a method for increasing the magnitude of a current supplied to the amorphous wire 44 may be mentioned. Furthermore, for example, by the use of a circuit amplifying the output voltage Vs of the electromagnetic coil 45 and a circuit dividing the output voltage Vh of the electromagnetic coil 25, the ratio between the above two output voltages can be changed into a desirable ratio.

Figure 6:
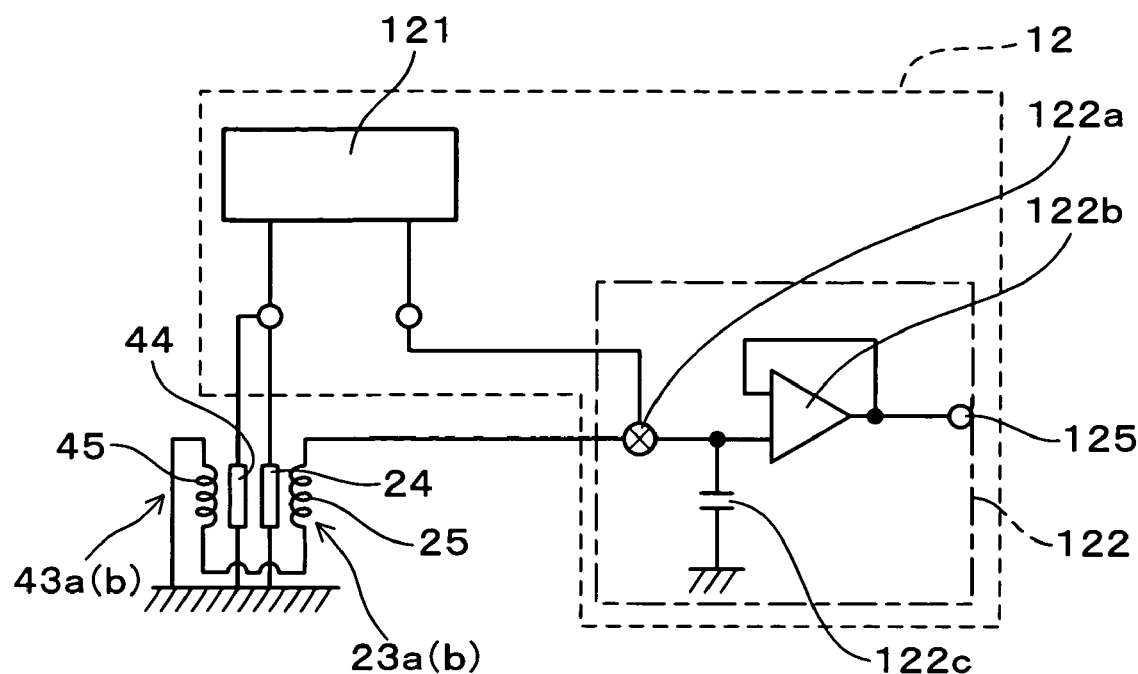
FIG. 6 is an equivalent circuit diagram of an electrical circuit of an IC chip provided in an accelerometer, according to Embodiment 1.

Next, the IC chip 12 functioning as an internal circuit has an electrical circuit controlling the magnetic detecting head portions 23a and 23b of the detecting units 2a and 2b, respectively, and the peripheral magnetic field detecting portions 43a and 43b. As shown in FIG. 6, the IC chip 12 includes a signal generating unit 121 generating a pulse current (see FIG. 7A) input to the amorphous wires 24 and 44 connected to each other in parallel and a signal processing unit 122 outputting a signal in accordance whith an output voltage Va (see FIG. 7B) generated between the two ends of the electromagnetic coils 25 and 45 connected to each other in series. The signal generating unit 121 is formed so as to generate a pulse current having a current application time of 40 nanoseconds and a pulse interval of 5 microseconds. Furthermore, the signal generating unit 121 is also formed so as to output a trigger signal synchronized with a rapid decrease of the pulse current to an analog switch 122a of the signal processing unit 122. In addition, instead of the amorphous wires 24 and 44 connected to each other in parallel of this embodiment, the structure may also be formed in which a pulse current is supplied to the amorphous wires 24 and 44 connected to each other in series.

As shown in FIG. 6, the signal processing unit 122 has the analog switch 122a switching the electrical connection between the electromagnetic coil 25 and the signal processing unit 122 synchronized with the trigger signal described above. This signal processing unit 122 includes a capacitor 122c connected to the electromagnetic coil 25 via the analog switch 122a, thereby forming a synchronous detection circuit functioning as a so-called peak-hold circuit. In addition, this synchronous detection circuit is provided with an amplifier 122b.

Next, a magnetic detecting method by the magnetic detecting head portion 23a (23b) and the peripheral magnetic field detecting portion 43a (43b) of this embodiment will be briefly described. As shown in FIG. 7, when the pulse current (see FIG. 7(a)) supplied to the amorphous wire 24 (44) is rapidly decreased, the output voltage Va (see FIG. 7(b)) is measured which is generated between the two ends of the electromagnetic coils 25 and 45 electrically connected to each other in series. In this embodiment, an interrupting time in which the pulse current is rapidly decreased from 90% to 10% of the steady-state value (a current of 150 mA) is set to four nanoseconds.

In this embodiment, the electromagnetic coils 25 and 45 are electrically connected to each other in series. Accordingly, a voltage value (the above output voltage Va) input to the signal processing unit 122 is a value Va which is the output voltage Vh, i.e., the inductive voltage of the electromagnetic coil 25, added with the output voltage Vs, i.e., the inductive voltage of the electromagnetic coil 45 (that is, Va=Vh+Vs in which Vh=Va+(1+k)·Vm and Vs=(−(1+k)·Vm) are satisfied).

That is, as shown in FIG. 7, at the moment at which the pulse current supplied to the amorphous wire 24 (44) placed in a magnetic field is interrupted, the output voltage Vh (Vs) having a magnitude proportional to a longitudinal direction component of the amorphous wire 24 (44) is generated between the two ends of the electromagnetic coil 25 (45). Hence, in the IC chip 12 of this embodiment, the voltage Va obtained by adding the output voltage Vh to the output voltage Vs (since the voltages Vh has an opposite (positive or negative) sign to the voltage Vs, the voltage Va is obtained substantially by subtraction) is applied to the capacitor 122c via the analog switch 122a. Subsequently, a signal corresponding to a potential difference generated by electrical charges accumulated in the capacitor 122c is output from an output terminal 125 via the amplifier 122b.

Figure 8:
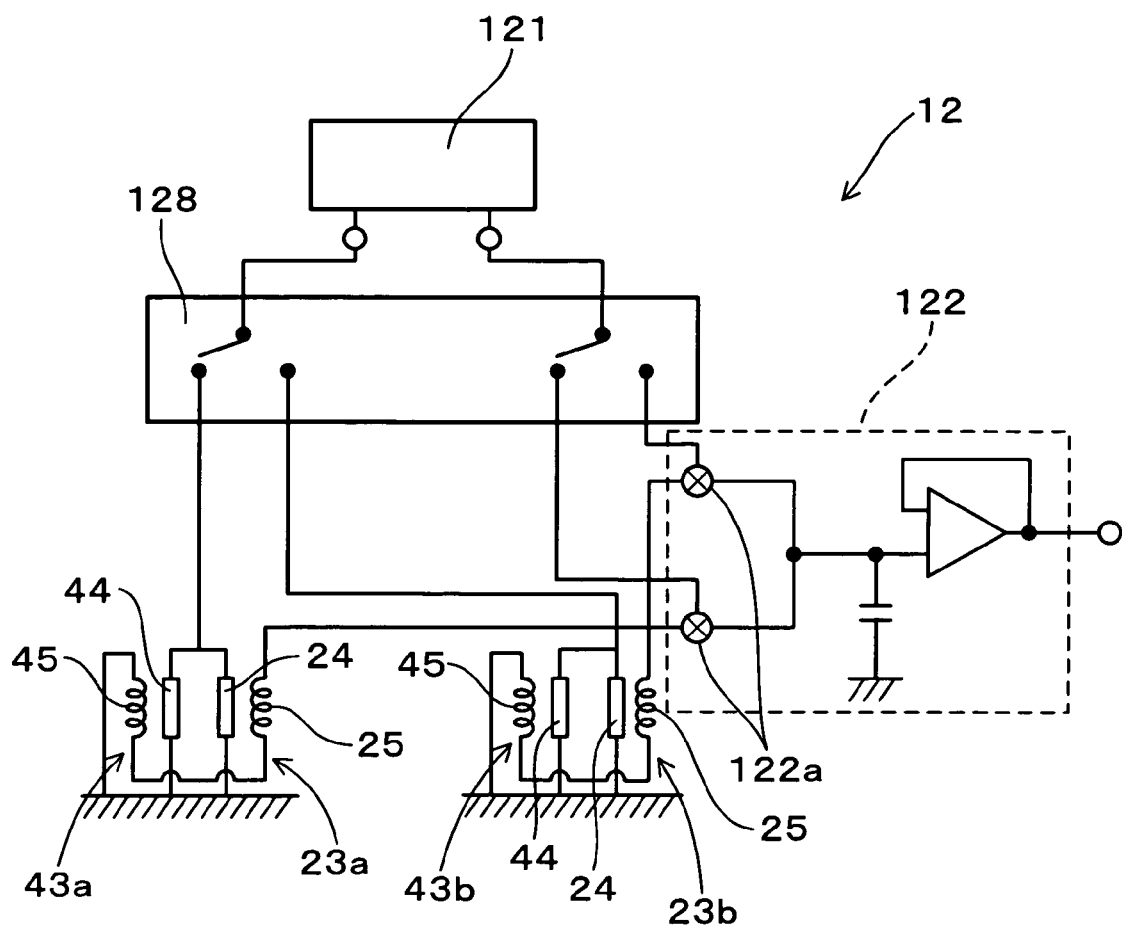
FIG. 8 is a circuit diagram of an electrical circuit of an IC chip provided in an accelerometer, according to Embodiment 1.

Furthermore, as shown in FIG. 8, the electrical circuit of the IC chip 12 of this embodiment has an electronic switch 128 for switching an electrical route from the signal generating unit 121 to the amorphous wires 24 and 44 and for switching an electrical route from the signal generating unit 121 to the analog switch 122a. The electronic switch 128 is formed so that a pulse signal from the signal generating unit 121 is input to one of the detecting units 2a and 2b and so that a trigger signal from the signal generation unit 121 is input to one of the two analog switches 122a. In this structure, one analog switch 122a is connected to the electromagnetic coil 25 of the detecting unit 2a and the other analog switch 122a is connected to the electromagnetic coil 25 of the detecting unit 2b.

In this embodiment, by the electrical circuit thus formed, the detecting units 2a and 2b share the signal processing unit 122 of the IC chip 12 in a time sharing manner. In addition, the switching of the electronic switch 128 may be performed by an internal signal generated inside the IC chip 12 or may be performed by an external signal supplied from the outside.

As described above, the accelerometer 1 of this embodiment has the peripheral magnetic field detecting portion 43a (43b) measuring a peripheral magnetic field applied to the magnetic detecting head portion 23a (23b) and the magnet body 21a (21b). By this peripheral magnetic field detecting portion 43a (43b), the peripheral magnetic field directly applied to the magnetic detecting head portion 23a (23b) can be detected. Hence, by the peripheral magnetic field detecting portion 43a (43b), of the detection signal (Vh) of the magnetic detecting head portion 23a (23b), the error component (Vm) generated by a peripheral magnetic field can be corrected.

Furthermore, by the peripheral magnetic field detecting portion 43a (43b), a peripheral magnetic field can be detected which is applied to the magnet body 21a (21b) and which generates a torque therein so as to elastically deform the cantilever 22. When this peripheral magnetic field can be detected, regardless of acting acceleration, the amount of displacement of the magnet body 21a (21b) caused by influence of the peripheral magnetic field can be estimated. In addition, of the output signal (Vh) of the magnetic detecting head portion 23a (23b), the error component (Vt) can be corrected which is indirectly caused by a peripheral magnetic field through the displacement of the magnet body 21a (21b).

According to the accelerometer 1 of this embodiment, of the measure signal of the magnetic detecting head portion 23a (23b), the error component (Vm) caused by direct influence of the peripheral magnetic field and the error component (Vt) caused by indirect influence thereof can be corrected, and hence the acting acceleration can be accurately measured.

Figure 9:
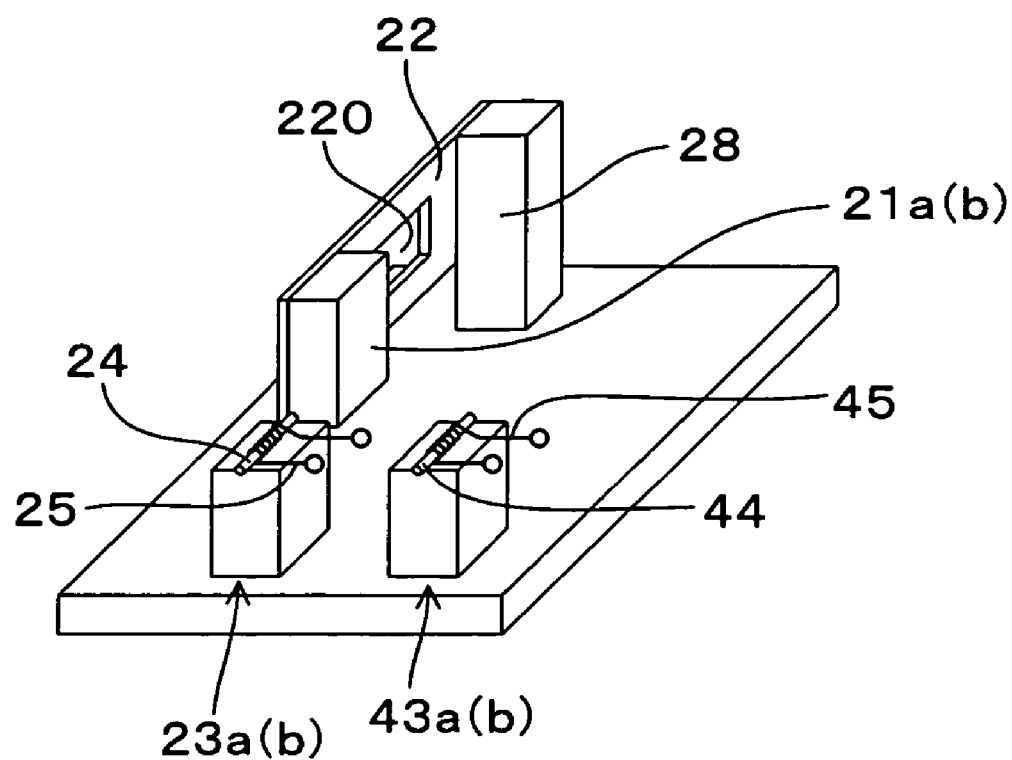
FIG. 9 is a view for illustrating the placement of a magnetic detecting head portion and a peripheral magnetic field detecting portion, according to Embodiment 1.
Figure 10:
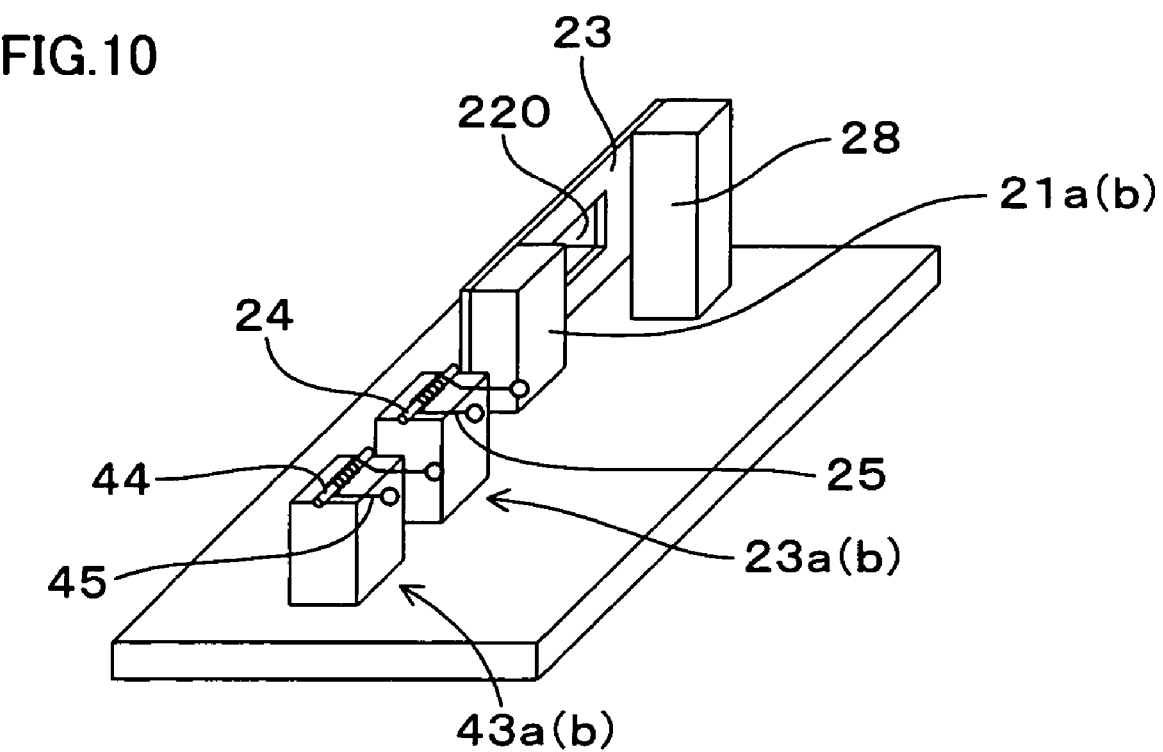
FIG. 10 is a view for illustrating the placement of a magnetic detecting head portion and a peripheral magnetic field detecting portion, according to Embodiment 1.

The magnetic detecting head portion 23a (23b) and the peripheral magnetic field detecting portion 43a (43b) may be placed so that the amorphous wires 24 and 44 are disposed in parallel as shown in FIG. 9 or are aligned as shown in FIG. 10.

Embodiment 2

In this embodiment, the case in which the structure of the peripheral magnetic field detecting portion and that of the IC chip are different from that in Embodiment 1 will be described with reference to FIGS. 11 to 14.

Figure 11:
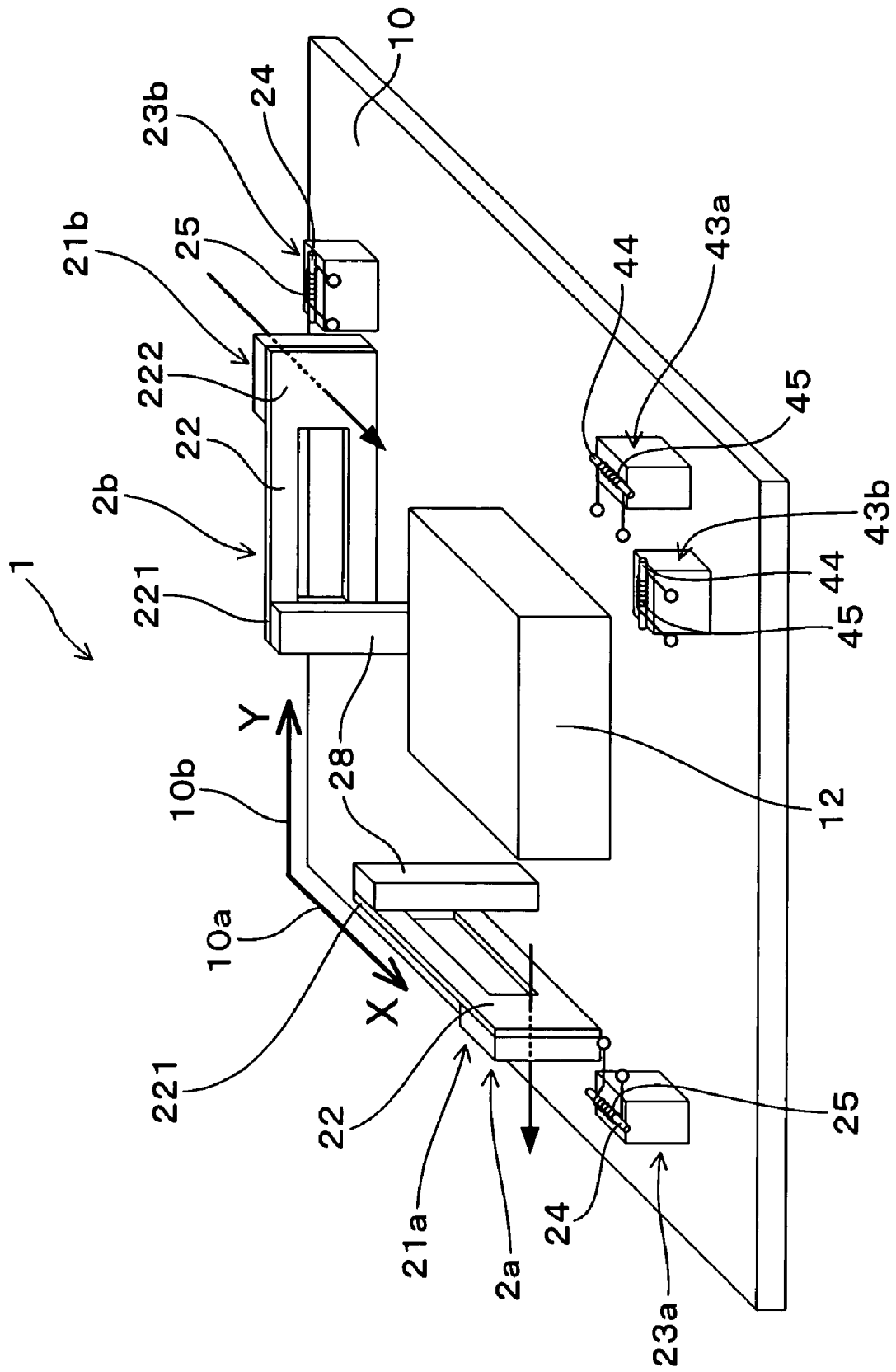
FIG. 11 is a perspective view showing an accelerometer according to Embodiment 2.

As shown in FIG. 11, the peripheral magnetic field detecting portion 43a (43b) of the accelerometer 1 of this embodiment has the same specification as that of the magnetic detecting head portion 23a (23b). That is, the peripheral magnetic field detecting portion 43a (43b) and the magnetic detecting head portion 23a (23b) are formed to generate the same output voltage when magnetic fields equivalent to each other are applied thereto.

Figure 12:
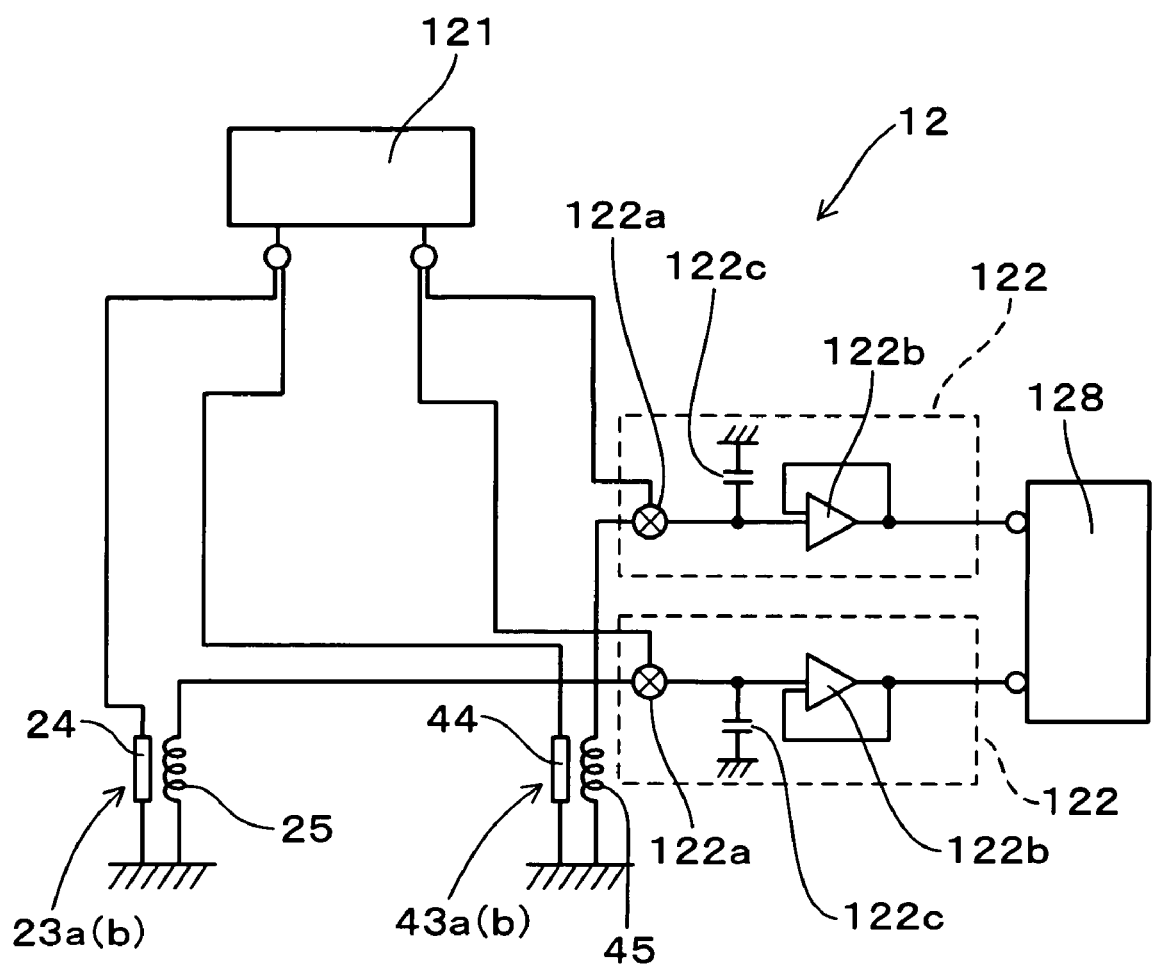
FIG. 12 is an equivalent circuit diagram of an electrical circuit of an IC chip provided in an accelerometer, according to Embodiment 2.

Furthermore, as shown in FIG. 12, in the IC chip 12 of the accelerometer 1 of this embodiment, the signal generating unit 121 simultaneously supplies a pulse current to the amorphous wire 24 of the magnetic detecting head portion 23a and to the amorphous wire 44 of the peripheral magnetic field detecting portion 43a. In addition, this IC chip 12 has two signal processing units 122 so that the output voltage (Vh) of the electromagnetic coil 25 of the magnetic detecting head portion 23a (23b) and the output voltage (Vs) of the electromagnetic coil 45 of the peripheral magnetic field detecting portion 43a (43b) are processed in parallel. In addition, the IC chip 12 has a CPU 128 in which two signals obtained by processing the above output voltages of the electromagnetic coils 25 and 4 are input in parallel, followed by a predetermined computing process.

This CPU 128 is formed so as to read programs stored in a memory (not shown in the figure) for performing a predetermined computing process between the output voltage Vh of the electromagnetic coil 25 and the output voltage Vs of the electromagnetic coil 45. That is, in this embodiment, computing represented by Va=Vh−(1+k)×Vs is performed in the CPU 128. In addition, the accelerometer 1 of this embodiment is formed so as to output the above value Va outside.

Instead of the computing process performed by the CPU 128, an analog or a digital signal processing circuit may be formed so as to perform the same computing process as described above.

In addition, in the IC chip 12, the electrical circuit described above may be formed for each of the detecting units 2a and 2b, and alternatively, the detecting units 2a and 2b may share the electrical circuit shown in FIG. 11 in a time sharing manner.

The rest of the structure and the operational effects are the same as those described in Embodiment 1.

Figure 13:
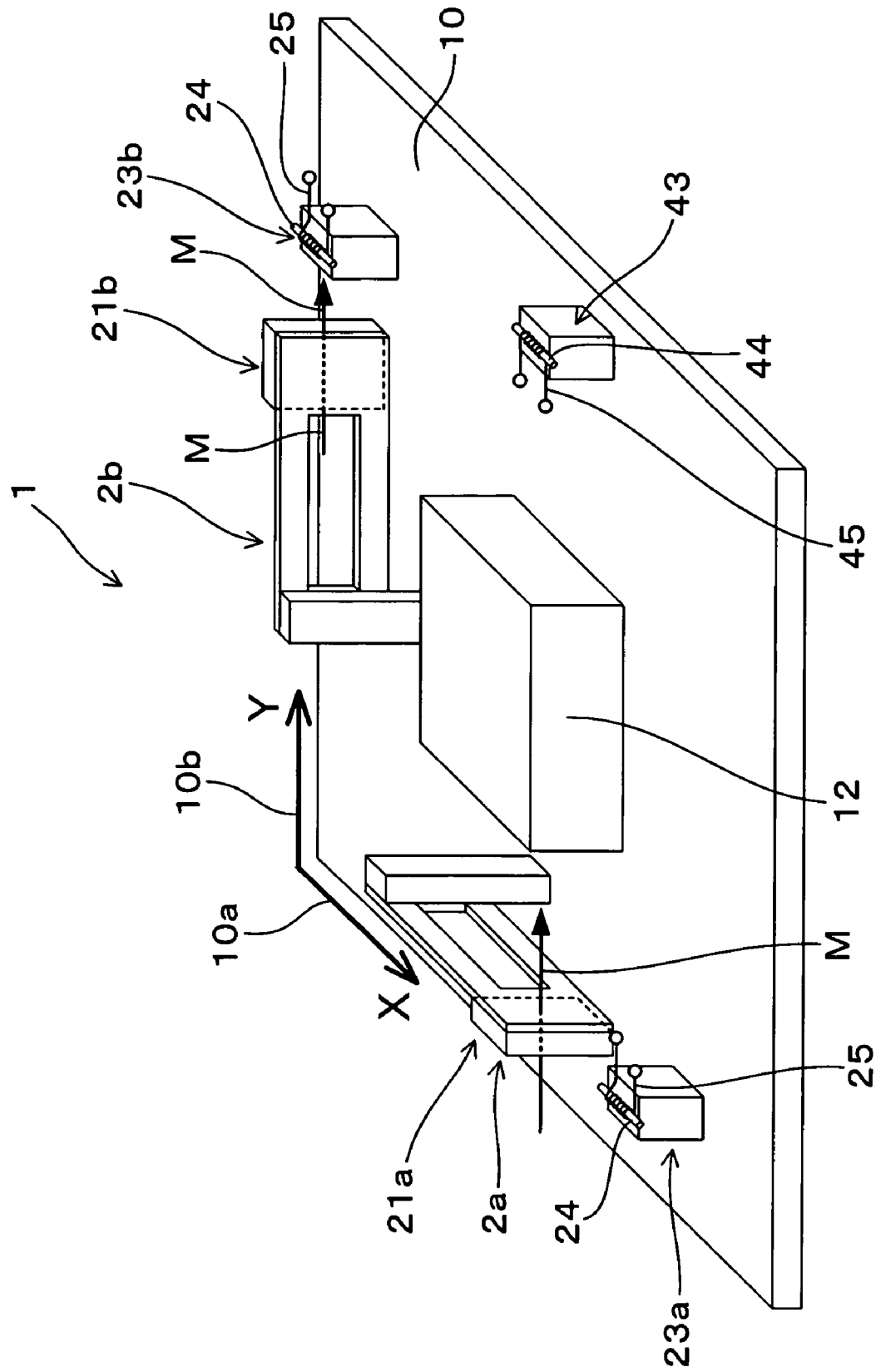
FIG. 13 is a perspective view showing another accelerometer according to Embodiment 2.

Furthermore, as shown in FIG. 13, the detecting units 2a and 2b may be formed so that the magnetization directions M of the respective magnet bodies 21a and 21b are the same. In this case, the axis directions of the amorphous wires 24 of the magnetic detecting head portions 23a and 23b are allowed to coincide with each other. Furthermore, in this case, the magnetization directions generating torques in the magnet bodies 21a and 21b coincide with each other. Hence, in this case, by the use of the common peripheral magnetic field detecting portion 43, measure signals of the detecting units 2a and 2b may be corrected.

Figure 14:
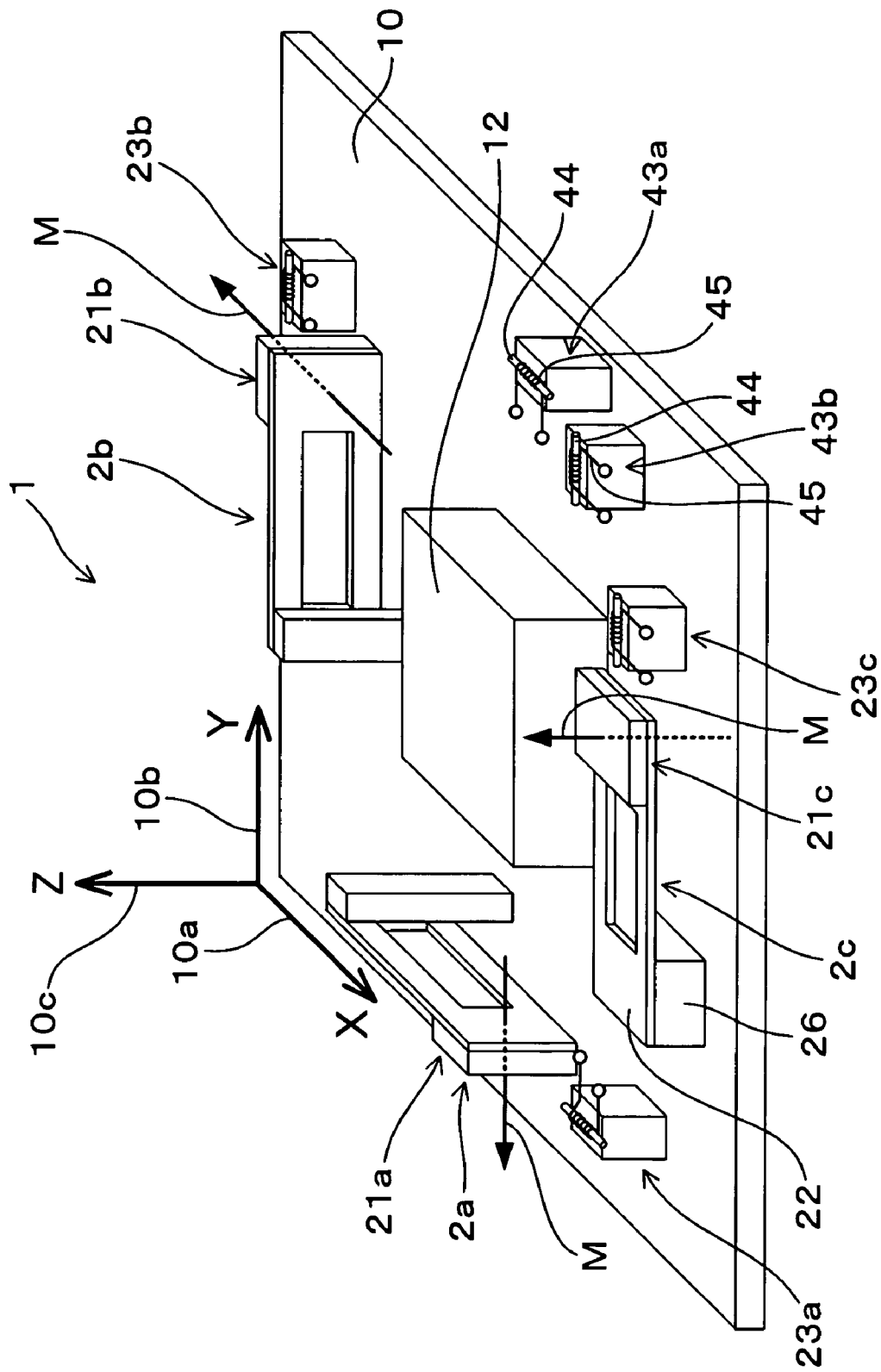
FIG. 14 is a perspective view showing another accelerometer according to Embodiment 2.

In addition, as shown in FIG. 14, in the accelerometer 1 of this embodiment, a detecting unit 2c for detecting acceleration acting along a Z axis 10c direction may also be provided. In the case shown in the figure, the longitudinal direction of an amorphous wire 24 of a magnetic detecting head portion 23c and that of the amorphous wire 24 of the magnetic detecting head portion 23b are allowed to coincide with each other. Furthermore, the magnetization direction generating a torque in the magnet body 21b and that in a magnet body 21c coincide with each other. Hence, the peripheral magnetic field detecting portion 43b provided for correcting the measure signal of the detecting unit 2b may be used for correcting that of the detecting unit 2c. Alternatively, a peripheral magnetic field detecting portion exclusively used for the detecting unit 2c may be separately provided.

Embodiment 3

In Embodiment 3, as shown in FIGS. 15 to 22, the accelerometer 1 will be described in which a support member 280 supporting the fixed end of the cantilever 22 has an approximately L-shaped cross-section.

Figure 16:
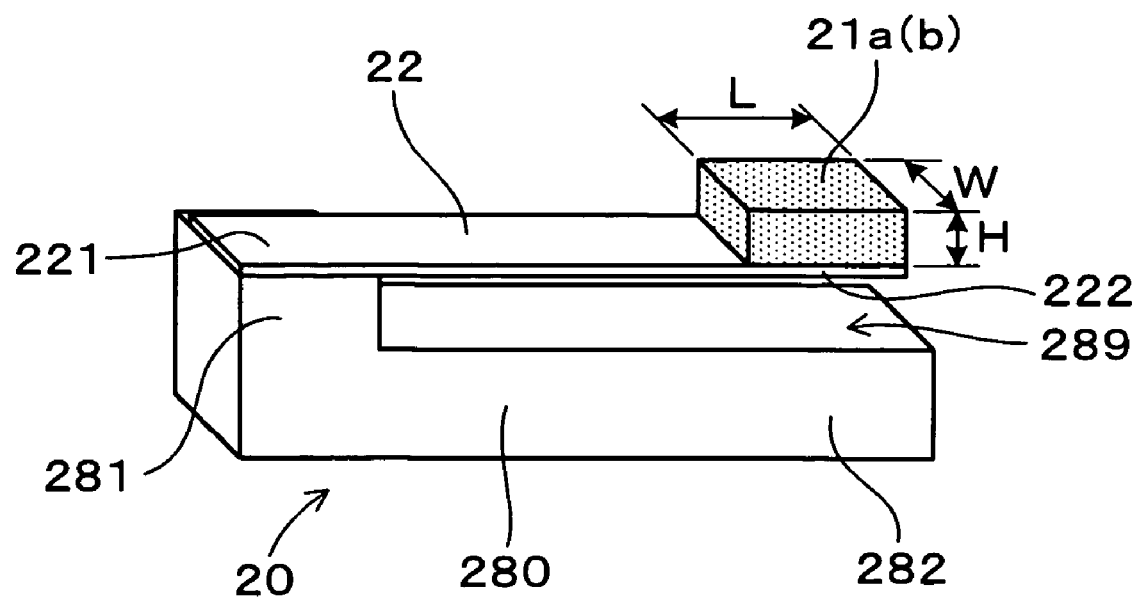
FIG. 16 is a perspective view showing an acceleration sensing part according to Embodiment 3.

That is, as shown in FIG. 16, the support member 280 has a base portion 281 bonded to the fixed end 221 and an extending portion 282 extending from the base portion 281 to the side of the free end 222 of the cantilever 22, and a space 289 is provided between the cantilever 22 and the extending portion 282. In addition, on a surface of the free end 222 of the cantilever 22 which is opposite to the space 289 side, the magnet body 21a (21b) is disposed.

In this embodiment, the magnet body 21a (21b) may be formed to have a length L of 0.2 to 0.6 mm, a width W of 0.2 to 0.8 mm, and a height H of 0.05 to 0.2 mm. The length L is a length from the fixed end 221 of the cantilever 22 to the free end 222. In addition, the width W is a width orthogonal to the direction of the length L and parallel to the surface of the cantilever 22. Furthermore, the height H is a height orthogonal to the surface of the cantilever 22.

The cantilever 22 is made of a Ni—P alloy and the support member 280 is made of a ceramic.

Figure 22:
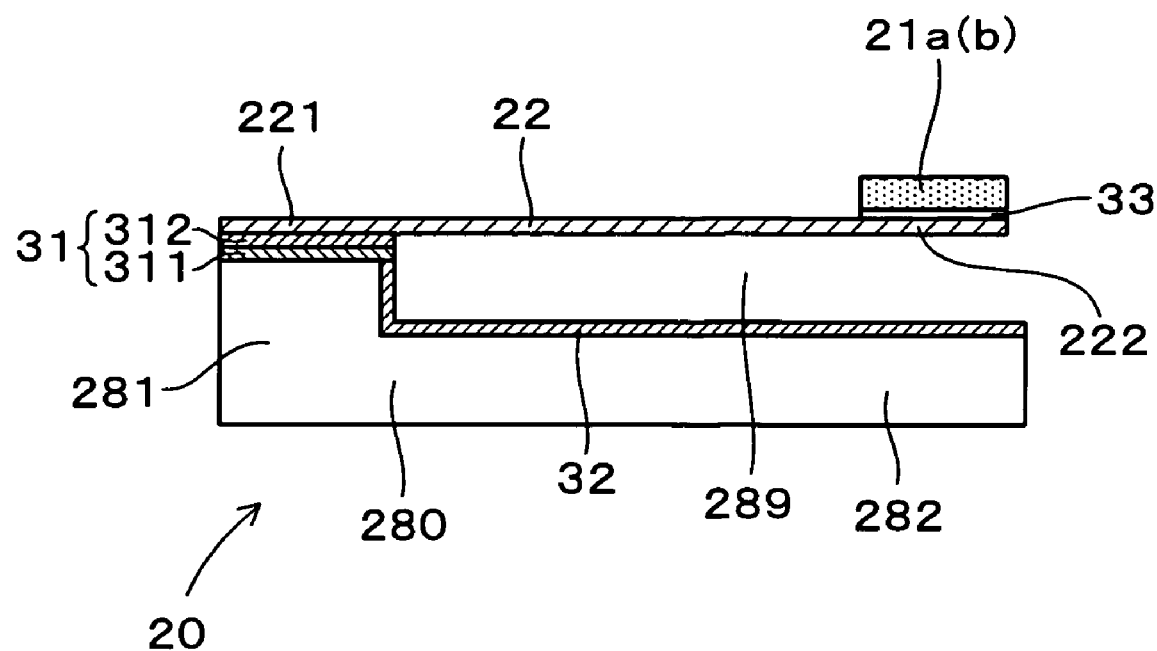
FIG. 22 is a cross-sectional view showing an acceleration sensing part according to Embodiment 3.

As shown in FIG. 22, a multiple metal-layer 31 composed of a plurality of metal layers is provided between the support member 280 and the fixed end 221 of the cantilever 22.

The multiple metal-layer 31 is composed of a first metal layer 311 provided adjacent to the support member 280 and a second metal layer 312 provided adjacent to the cantilever 22. The first metal layer 311 is composed of at least one element of Ti, Cr, and Al, and the second metal layer 312 is composed of at least one of Cu, Au, and Ag.

In addition, the support member 280 has a conductive layer 32 on a surface of the extending portion 282 facing the cantilever 22, and this conductive layer 32 is electrically connected to the cantilever 22.

The conductive layer 32 is preferably connected to the ground of the electrical circuit formed on the IC substrate 10. In addition, the conductive layer 32 is preferably formed on the entire facing surface but may be formed on a part thereof.

In addition, the magnet body 21a (21b) includes a resin magnet or includes a magnet and a resin layer which is to be bonded to the cantilever 22. The cantilever 22 is provided with a metal layer (passivation film-forming metal layer 33) forming a stable passive film which is to be bonded to the magnet body 21a (21b).

This passivation film-forming metal layer 33 is formed using one of Cr, Al, Zn, and Ti.

In addition, when formed of a sintered magnet or the like, the magnet body 21a (21b) has a resin layer which is to be bonded to the cantilever 22 as described above. On the other hand, when the magnet body 21a (21b) is a resin magnet, the magnet body 21a (21b) is directly formed on the passivation film-forming metal layer 33 provided on the cantilever 22.

Next, a manufacturing method of an acceleration sensing part 20 of the accelerometer 1 of this embodiment will be described with reference to FIGS. 17 to 22 by way of example, the acceleration sensing part 20 being formed in combination of the cantilever 22 and the support member 280.

Figure 17:
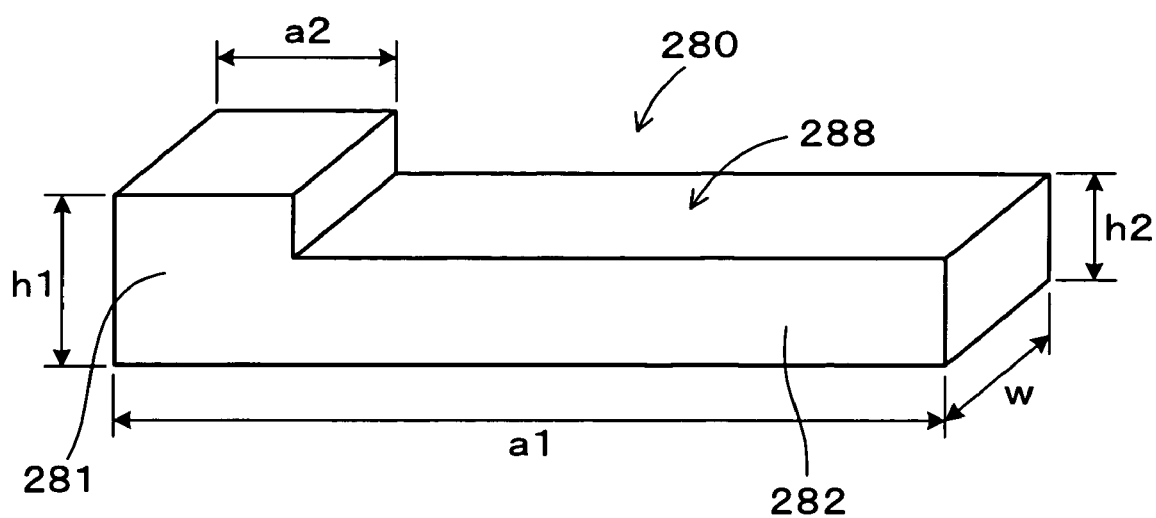
FIG. 17 is a perspective view showing a support member according to Embodiment 3.

First, as shown in FIG. 17, the L-shaped support member 280 made of a ceramic is formed. The support member 280 has a width w of 0.6 mm, a length a1 of 2.0 mm, a height h1 of the base portion 281 of 0.4 mm, a height h2 of the extending portion 282 of 0.3 mm, and a length a2 of the base portion 281 of 0.4 mm.

Figure 18:
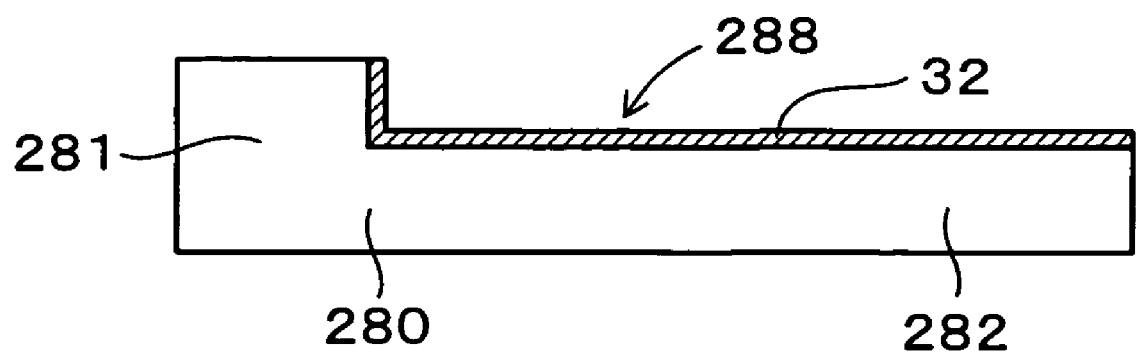
FIG. 18 is a cross-sectional view of a semi-finished acceleration sensing part for illustrating a manufacturing step thereof, according to Embodiment 3.

Next, as shown in FIG. 18, on a surface of a L-shaped step portion 288 of the support member 280, that is, on a surface of the extending portion 282 of the support member 280 facing the cantilever 22 and on a side surface of the base portion 281 connected to the surface described above, the conductive layer 32 is formed by sputtering Cr to have a thickness of 0.1 μm.

Figure 19:
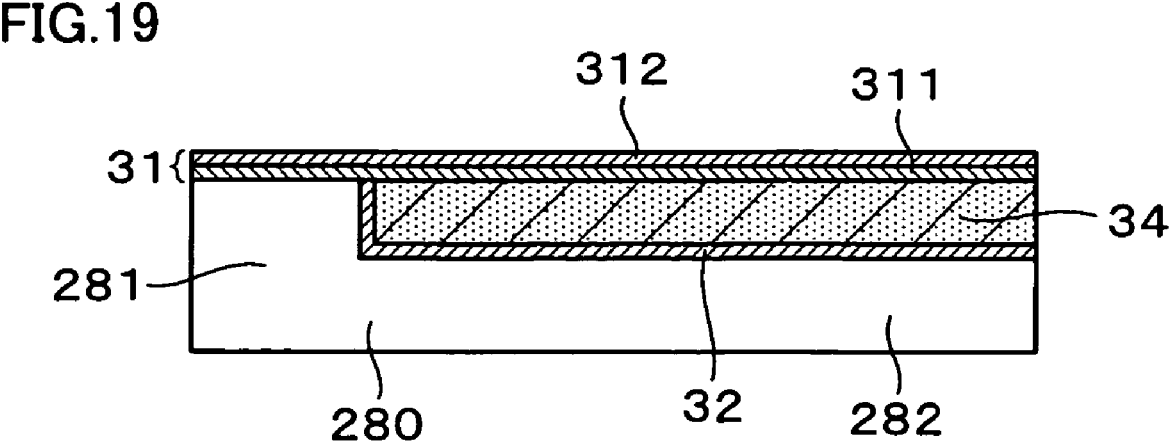
FIG. 19 is a cross-sectional view of a semi-finished acceleration sensing part for illustrating a manufacturing step following the step shown in FIG. 18, according to Embodiment 3.

In addition, as shown in FIG. 19, a sacrifice layer 34 is formed on the conductive layer 32 provided on the L-shaped step portion 288 to form a rectangular parallelepiped on the whole, the sacrifice layer 34 being a layer to be removed in a subsequent step.

Next, on a surface formed by the sacrifice layer 34 and the base portion 281 of the support member 280, a Ti layer having a thickness of 0.07 μm is formed by sputtering, and in addition, in a vacuum state, a Cu layer having a thickness of 0.3 μm is also formed by sputtering, thereby forming the multiple metal-layer 31 composed of the first metal layer 311 and the second metal layer 312.

Figure 20:
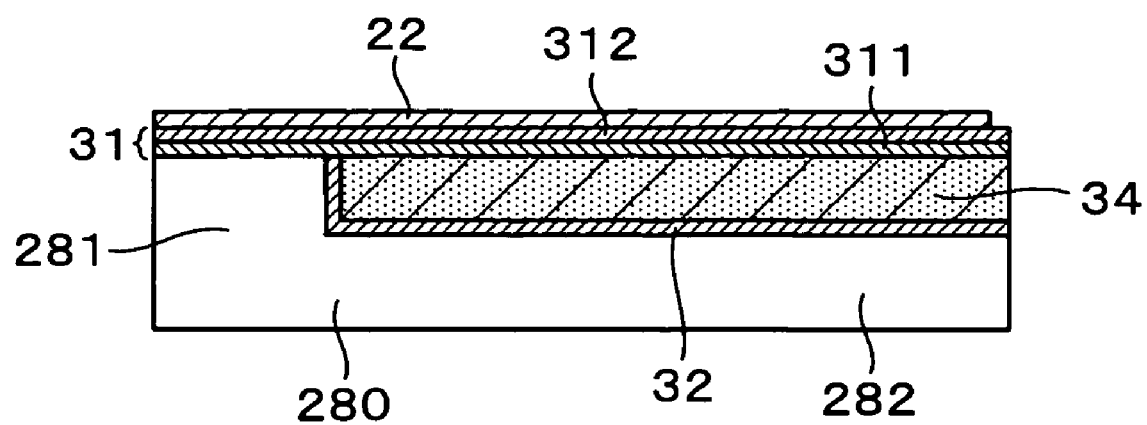
FIG. 20 is a cross-sectional view of a semi-finished acceleration sensing part for illustrating a manufacturing step following the step shown in FIG. 19, according to Embodiment 3.

Furthermore, as shown in FIG. 20, the cantilever 22 is formed using a Ni—P alloy by pattern plating. The cantilever 22 has a thickness of 3 μm, a width of 0.5 mm, and a length of 1.9 mm.

Figure 21:
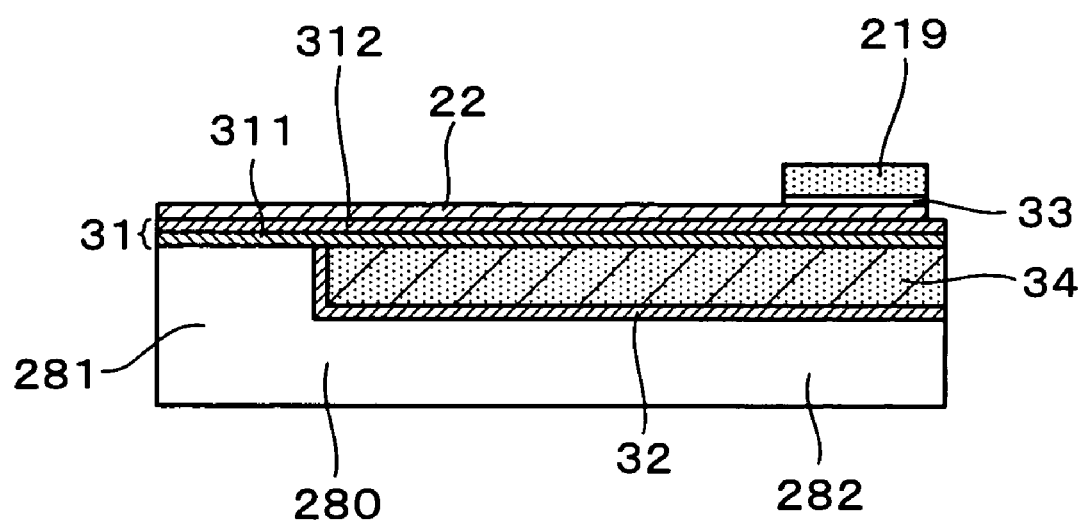
FIG. 21 is a cross-sectional view of a semi-finished acceleration sensing part for illustrating a manufacturing step following the step shown in FIG. 20, according to Embodiment 3.

Next, as shown in FIG. 21, a passive film-forming metal layer 33 is formed by sputtering Cr in an area in which the magnet body 21a (21b) is to be disposed.

Instead of the sputtering described above, another known film forming means such as PVD or CVD may be used.

Subsequently, on the passivation film-forming metal layer 33, an ink magnet material 219 composed of SmFeN (75 percent by weight) and an epoxy resin (25 percent by weight) is printed.

Next, after the ink magnet material 219 is oriented by a magnetic field in a desired direction with respect to the cantilever 22, and the epoxy resin is cured to a certain extent, magnetization is performed in a predetermined direction, thereby forming the magnet body 21a (21b). In this case, the orientation described above is a step required when the ink magnet material 219 is an anisotropic material, and when an isotropic material is used, the step described above is not necessary.

Next, as shown in FIG. 22, the sacrifice layer 34, the Ti layer, and the Cu layer are removed, the latter two layers being provided on the sacrifice layer 34, so that the cantilever 22 is formed of a Ni—P single layer.

Furthermore, by heating the acceleration sensing part 20 to 100° C. or more, the magnet body 21a (21b) is processed by heat treatment.

Figure 15:
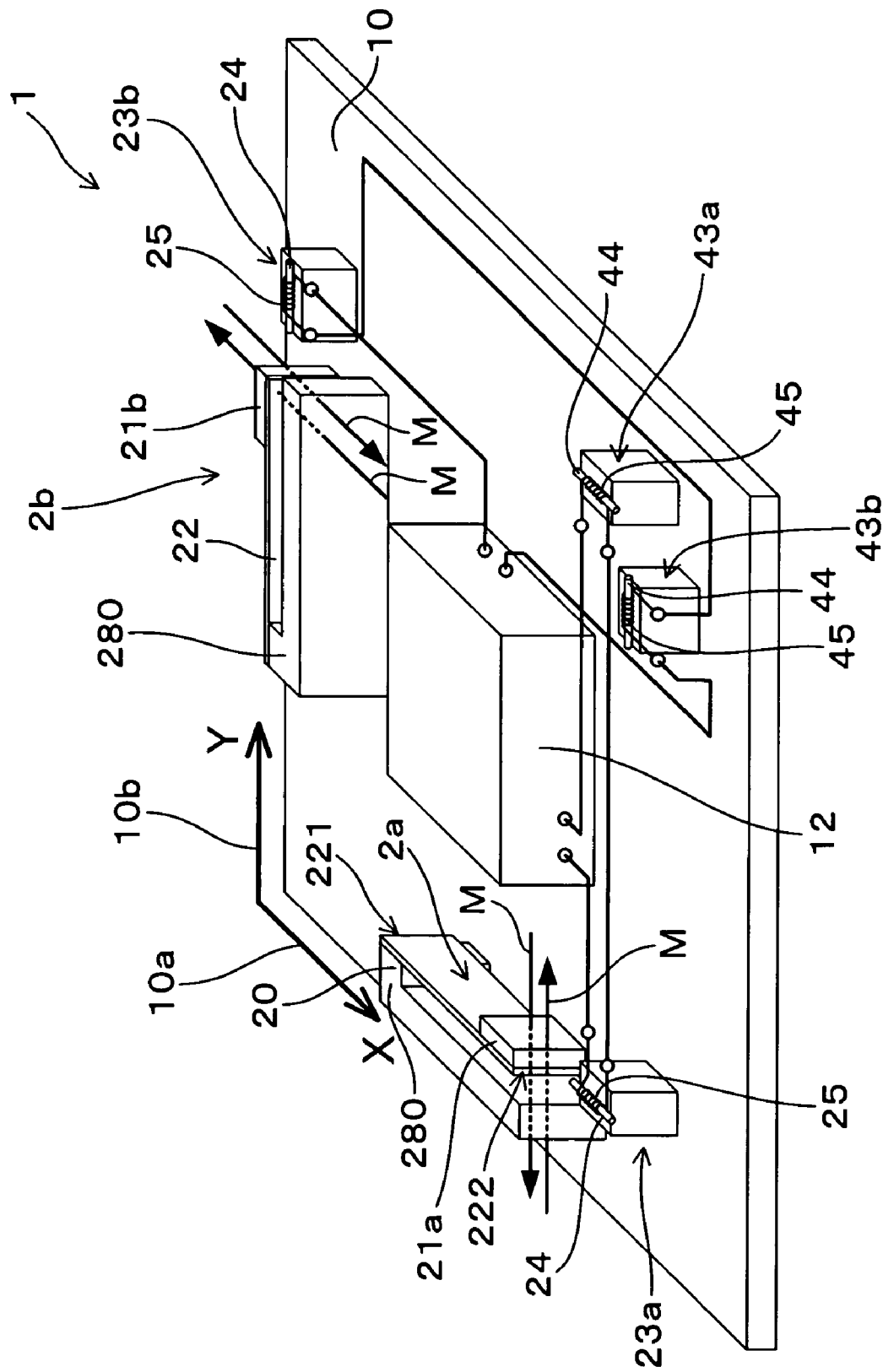
FIG. 15 is a perspective view showing an accelerometer according to Embodiment 3.

Next, the acceleration sensing part 20 thus obtained is fixed on a predetermined position of the IC substrate 10 as shown in FIG. 15.

The magnet body 21a (21b) may be formed by a known method, and as described above, for example, the ink magnet material is preferably used.

As the manufacturing methods, for example, a printing, dispensing, adhering, dipping, and vapor deposition (PVD, CVD) method may be mentioned.

In addition, a sintered magnet, a bonded magnet, and the like may also be used. As a magnet material, a metal magnet such as a ferrite or alnico magnet, or a known magnet such as a SmCo, SmFeN, or NdFeB-based magnet may be used.

In the case of a bonded magnet, as a resin, for example, a thermosetting resin, such as an epoxy resin or a phenol resin, or a thermoplastic resin such as a polyamide resin may be used.

As the orientation of the magnetic material, both isotropic and anisotropic properties may be used.

In addition, when a magnet having anisotropic properties is used as a magnet body, compared to a magnet having isotropic properties, a high signal magnetic field can be obtained.

As a manufacturing method, for example, a method may be used in which an orientation magnetic field is applied to a printed mixture of a resin and a powdered magnet, followed by magnetization.

In addition, as the coercive force of a magnet body, for example, since a soldering temperature of 180 to 300° C. is used in mounting the acceleration sensing part 20 on the IC substrate 10, a coercive force of 0.64 MA/m or more is required.

However, the magnet body to be used is not limited to that described above.

In addition, the rest of the structure of the accelerometer 1 of this embodiment other than the acceleration sensing part 20 described above is the same as that in Embodiment 1.

Next, operational effects of this embodiment will be described.

Since the support member 280 has the base portion 281 and the extending portion 282, when the support member 280 (acceleration sensing part 20) fixing the cantilever 22 is mounted on the IC substrate 10, the acceleration sensing part 20 can be easily handled.

That is, when the acceleration sensing part 20 is handled, in order to prevent the cantilever 22 from being deformed, a portion other than the cantilever 22, that is, the support member 280 is preferably held. Hence, when the support member 280 is formed to have the shape as described above, the support member 280 can be easily held, and hence the acceleration sensing part 20 can be easily handled.

In addition, when the length al of the support member 280 is formed slightly larger (such as approximately 0.1 mm) than that of the cantilever 22, the support member 280 can be easily held at the two ends thereof in the longitudinal direction without touching the cantilever 22.

In addition, since the cantilever 22 is made of a Ni—P alloy, a cantilever can be formed having superior spring properties, such as a low elastic modulus, a wide elastic deformation region, and a high breaking strength. Hence, the cantilever 22 can be formed so as to have a high acceleration-detecting accuracy and superior durability.

As a material for the cantilever 22, any materials having properties equivalent or superior to those described above may also be used.

In addition, as shown in FIG. 22, since the multiple metal-layer 31 is provided between the support member 280 and the fixed end 221 of the cantilever 22, the adhesion therebetween can be improved.

That is, the multiple metal-layer 31 is composed of the first metal layer 311 formed from at least one of Ti, Cr, and Al and the second metal layer 312 formed from at least one of Cu, Au, and Ag. Accordingly, since bonding to the support member 280 is secured by the first metal layer 312, and bonding to the cantilever 22 is secured by the second metal layer 312, the adhesion between the support member 280 and the cantilever 22 can be further improved.

In addition, since the support member 280 has the conductive layer 32, the facing surface of the extension portion 282 of the support member 280 facing the cantilever 22 is prevented from being electrostatically charged, and hence the displacement of the cantilever 22 caused by an electrostatic force can be prevented. Accordingly, the accelerometer 1 can be formed to have a higher accuracy.

In addition, the cantilever 22 is provided with the passive film-forming metal layer 33 on the surface thereof in an area to be bonded to the magnet body 21a (21b). Since the affinity between the passivation film and the resin is high, the adhesion between the cantilever 22 and the magnet body 21a (21b) can be improved.

That is, since the passivation film has reactive functional groups such as an oxygen-containing group and a hydroxyl group on the surface thereof, high affinity of the passivation film to a resin can be obtained. In addition, in a stable passivation film, the reactive functional groups such as an oxygen-containing group and a hydroxyl group are uniformly present on the surface thereof, and hence the affinity to a resin can be further increased. As described above, by increasing a chemical bonding force between the Ni—P alloy and the resin, the bonding between the cantilever 22 and the magnet body 21a (21b) can be improved.

In addition, since the passive film-forming metal layer 33 described above is formed from one of Cr, Al, Zn, and Ti, a particularly stable passive film can be formed.

In addition, the operational effects equivalent to that of Embodiment 1 are also obtained.

This embodiment may also be applied to various structures shown in Embodiment 2.

Embodiment 4

Figure 23:
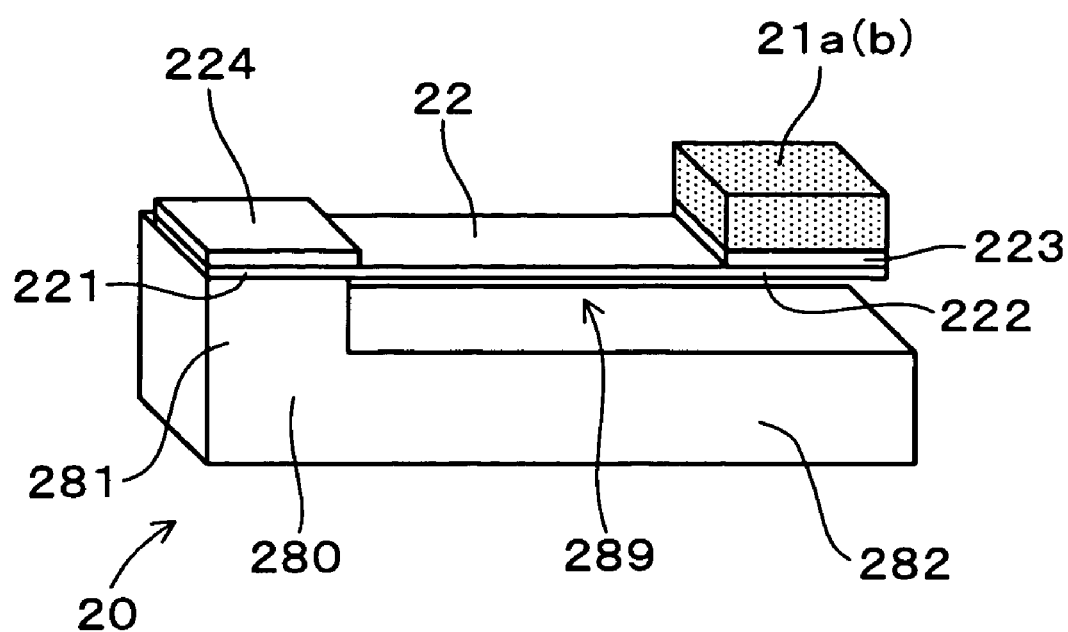
FIG. 23 is a perspective view showing an acceleration sensing part according to Embodiment 4.
Figure 24:
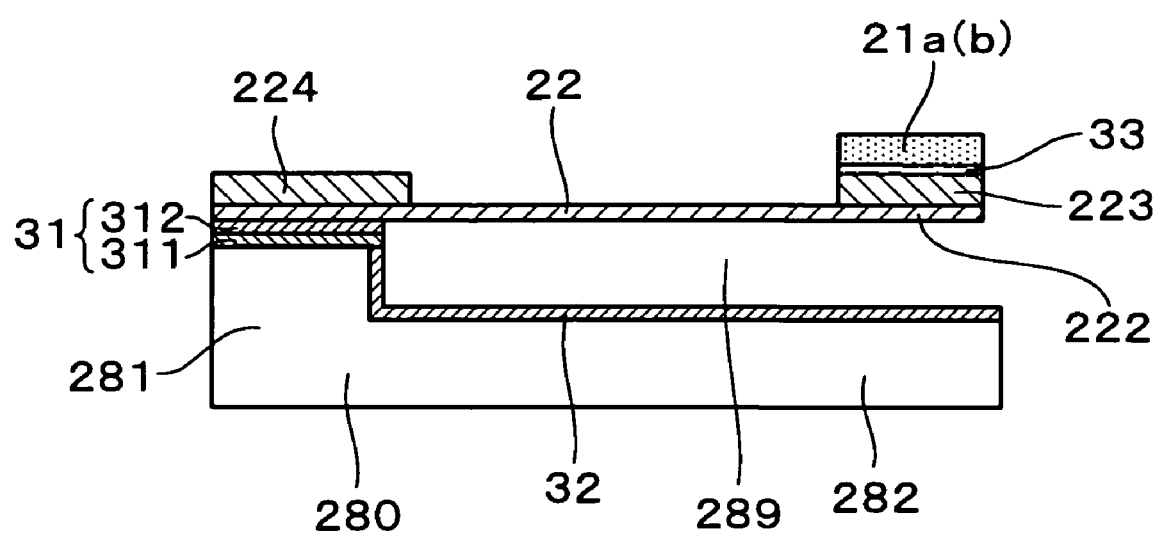
FIG. 24 is a cross-sectional view showing an acceleration sensing part according to Embodiment 4.

In this embodiment, as shown in FIGS. 23 and 24, the case will be described in which the rigidity of a magnet fixing region (free end 222) of the cantilever 22 on which the magnet body 21a (21b) is fixed is increased larger than that of the cantilever 22 at the fixed end 221 side.

That is, a reinforcing layer 223 is provided on the magnet fixing region of the cantilever 22. In addition, the magnet body 21 is disposed on the reinforcing layer 223 with the passive film-forming metal layer 33 interposed therebetween.

In addition, a reinforcing layer 224 is also formed on the fixed end 221 of the cantilever 22.

The reinforcing layers 223 and 224 each have a thickness, for example, of 3 to 100 μm.

The manufacturing method of the acceleration sensing part 20 of the accelerometer 1 of this embodiment is basically equivalent to that described in Embodiment 3.

However, in this embodiment, after the pattern plating of the cantilever 22 is performed, on the magnet fixing region (free end 222) of the cantilever 22 and a predetermined portion of the fixed end 221 thereof, Ni—P layers having a thickness of 20 μm are formed by plating. Accordingly, the reinforcing layers 223 and 224 are formed.

The rest of the structure is the same as that in Embodiment 3, and the same operational effects as that thereof are also obtained.

Embodiment 5

Figure 25:
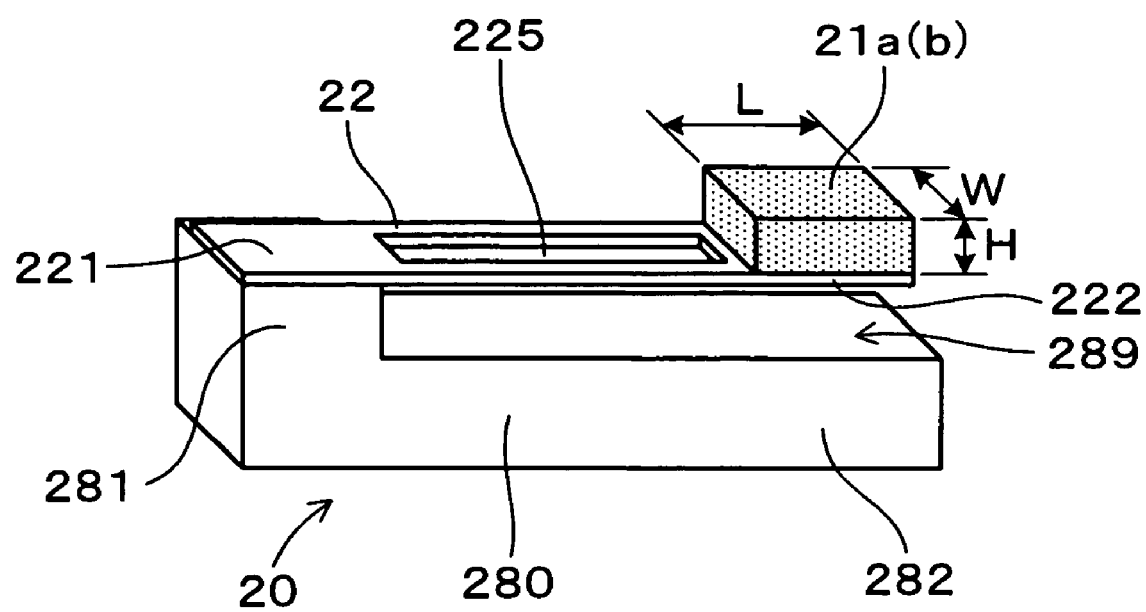
FIG. 25 is a perspective view showing an acceleration sensing part according to Embodiment 5.
Figure 26:
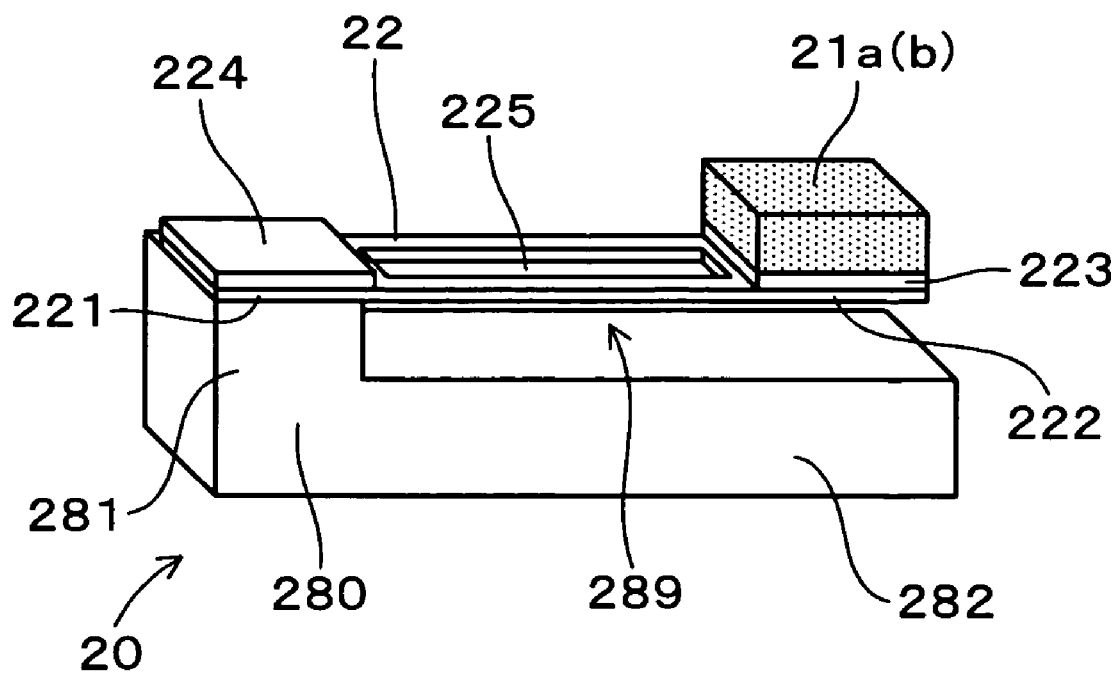
FIG. 26 is a perspective view showing another acceleration sensing part according to Embodiment 5.
Figure 27:
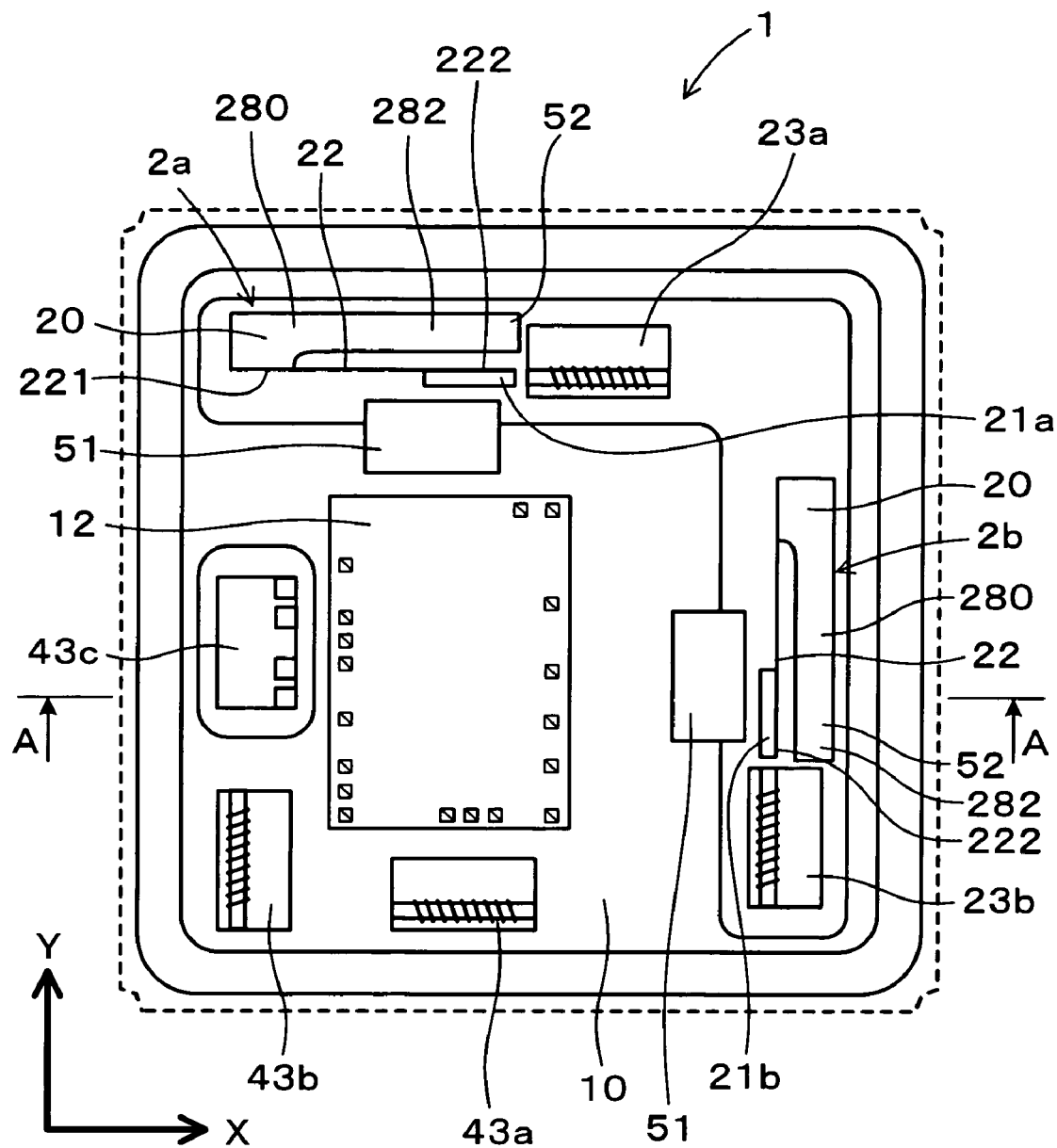
FIG. 27 is a plan view showing an accelerometer according to Embodiment 6.
Figure 28:
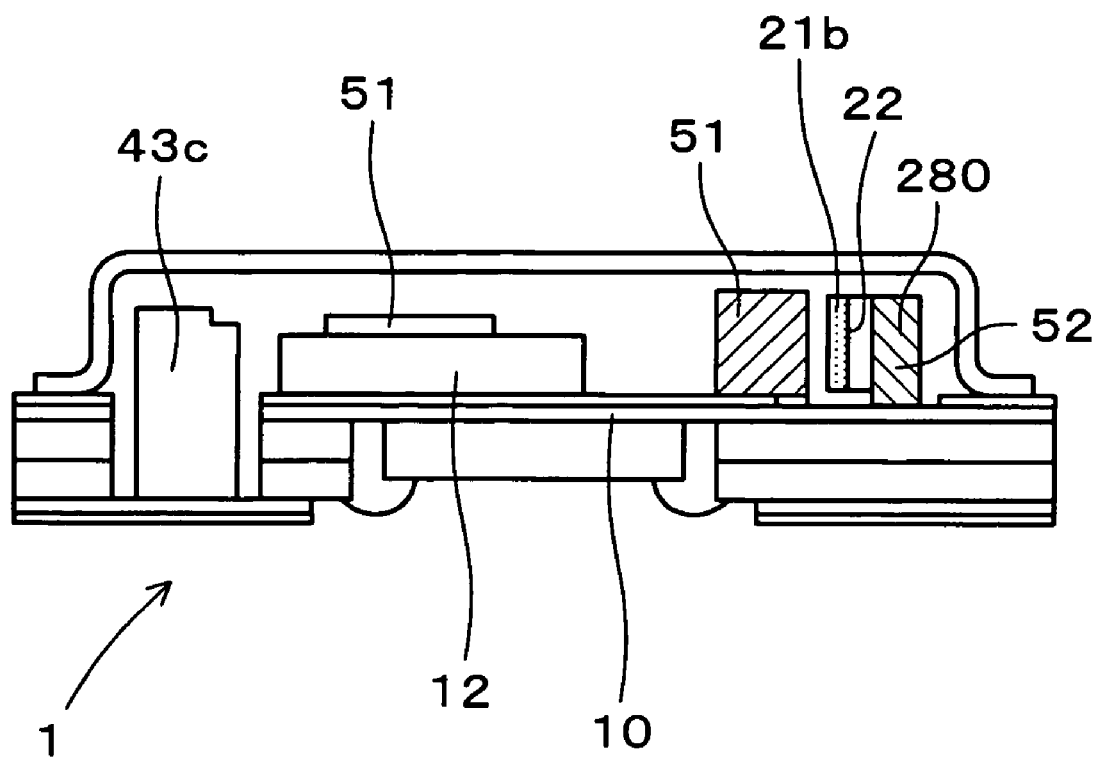
FIG. 28 is a cross-sectional view showing the accelerometer shown in FIG. 27 taken along the line A-A.

In this embodiment, as shown in FIGS. 25 and 26, the case in which an opening 225 is provided in the cantilever 22 will be described.

The opening 225 is formed between the fixed end 221 and the magnet body 21.

FIG. 25 shows the case in which the opening 225 is provided in the acceleration sensing part 20 of Embodiment 3, and FIG. 26 shows the case in which the opening 225 is provided in the acceleration sensing part 20 of Embodiment 4.

In the acceleration sensing part 20 shown in FIG. 26, the opening 225 is provided in a region in which the reinforcing layers 223 and 224 are not formed.

The rest of the structure is the same as that in Embodiment 3 or 4.

In this embodiment, the elastic modulus of the cantilever 22 can be partly decreased, and hence the amount of elastic deformation of the cantilever 22 with respect to a predetermined acceleration can be increased. Accordingly, the accelerometer 1 can be formed to have higher sensitivity.

In addition, the operational effects equivalent to that of Embodiment 3 or 4 are also obtained.

Embodiment 6

In the accelerometer 1 of this embodiment, as shown in FIGS. 27 to 30, the case will be described in which stoppers 51 and 52 are provided at the two sides of the rotational direction of the free end 222 of the cantilever 22 for preventing excessive displacement thereof.

One stopper 52 of the two stoppers 51 and 52 is integrally formed with the support member 280. That is, the extending portion 282 of the support member 280 functions as the stopper 52.

In addition, at a side opposite to the stopper 52 with the free end 222 of the cantilever 22 interposed therebetween, the stopper 51 independent of the support member 280 is fixed on the IC substrate 10.

Also in this embodiment, the acceleration sensing part 20 (see FIG. 16) shown in Embodiment 3 is used.

Figure 29:
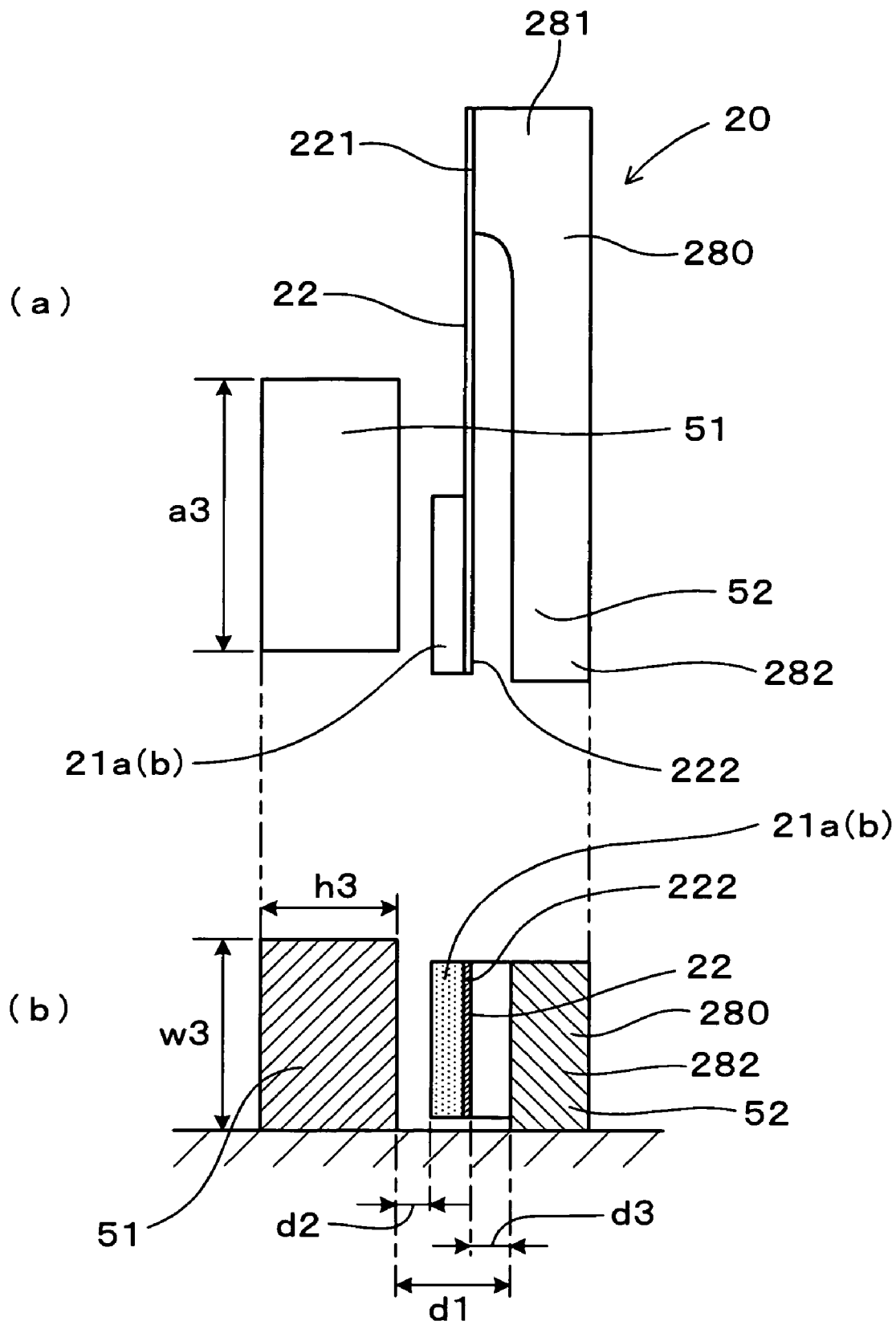
FIG. 29 shows a plan view and a cross-sectional view of an acceleration sensing part and stoppers, according to Embodiment 6.

Next, the stopper 51 is disposed at the side of the free end 22 of the cantilever 22 of the acceleration sensing part 20. As shown in FIG. 29, a space d1 between this stopper 51 and the extending portion 282 (stopper 52) of the acceleration sensing part 20 may be formed, for example, to have 0.4 mm.

In addition, for example, a space d2 between the stopper 51 and the magnet body 21a (21b) disposed at the free end 222 of the cantilever 22 may be formed, for example, to have 0.18 mm, and a space d3 between the stopper 52 (extending portion 282) and the free end 222 of the cantilever 22 may be formed, for example, to have 0.08 mm.

A length w3 of the stopper 51 in an erection direction with respect to the IC substrate 10 is preferably approximately equivalent to that of the support member 280 in the erection direction therewith, and for example, the length w3 may be set to 0.55 mm. In addition, a length h3 in a direction orthogonal to the cantilever 22 and a length a3 in a direction parallel thereto may be set to 0.5 mm and 0.9 mm, respectively.

In addition, the stopper 51 and the support member 280 are formed of silicon (Si).

In the accelerometer 1 of this embodiment, in addition to the peripheral magnetic field detecting portion 43a detecting an X axis direction component of a peripheral magnetic field and the peripheral magnetic field detecting portion 43b detecting a Y axis direction component of a peripheral magnetic field, a peripheral magnetic field detecting portion 43c detecting a Z axis direction component of a peripheral magnetic field is provided.

The rest of the structure is the same as that in Embodiment 3.

Figure 30:
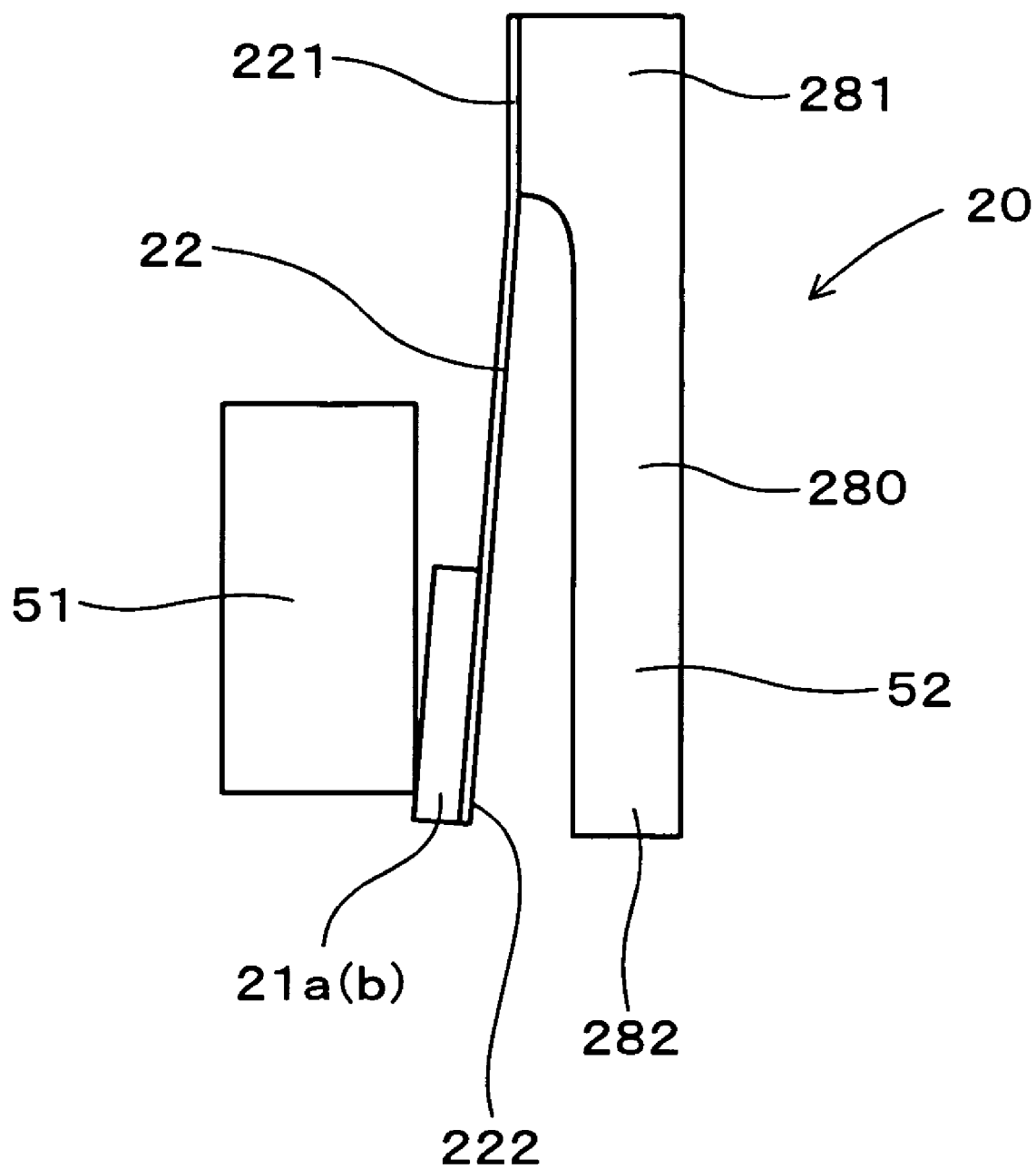
FIG. 30 is a plan view showing an acceleration sensing part and stoppers for illustrating functions of the stoppers, according to Embodiment 6.

In this embodiment, even when an intensive impact is applied to the accelerometer 1, and a large force is applied to the cantilever 22, as shown in FIG. 30, since the free end 222 of the cantilever 22 is brought into contact with the stopper 51 (or the stopper 52), unnecessary displacement (excessive displacement) can be prevented. Hence, deformation and damage of the cantilever 22 can be prevented.

In addition, since the stopper 52 is integrally formed with the support member 280, the number of parts forming the accelerometer 1 can be decreased, and as a result, easy assembly and reduction in cost can be advantageously obtained.

Furthermore, the same operational effects as those of Embodiment 3 are also obtained.

What is claimed is:

1. An accelerometer comprising:
   a substrate;
   at least one detecting unit comprising:
      a support member erected on the substrate;
      a cantilever which is elastically deformed to rotate around a fixed end thereof fixed by the support member;
      a magnet body provided at a free end of the cantilever; and
      a magnetic detecting head portion provided outside a rotation region of the cantilever; and
   at least one peripheral magnetic field detecting portion measuring a peripheral magnetic field applied to the magnetic detecting head portion and the magnet body for correcting a detection signal output from the magnetic detecting head portion.

2. The accelerometer according to claim 1,
   wherein a sensing direction of the peripheral magnetic field detecting portion in which magnetic detection sensitivity is maximum is parallel to a sensing direction of the magnetic detecting head portion in which magnetic detection sensitivity is maximum.

3. The accelerometer according to claim 1,
   wherein the magnetic detecting head portion and the peripheral magnetic field detecting portion each comprise a magnetic sensing member and an electromagnetic coil coiled around a periphery of the magnetic sensing member to form an MI element which generates a potential difference between two ends of the electromagnetic coil in accordance with a change in current supplied to the magnetic sensing member.

4. The accelerometer according to claim 3,
   wherein the magnetic detecting head portion and the peripheral magnetic field detecting portion are each formed to measure an intensity of an acting magnetic field by measuring an inductive voltage generated between the two ends of the electromagnetic coil when a current supplied to the magnetic sensing member is increased or decreased within 10 nanoseconds.

5. The accelerometer according to claim 4,
   wherein the magnetic detecting head portion and the peripheral magnetic field detecting portion are each formed to measure the inductive voltage generated between the two ends of the electromagnetic coil when the current supplied to the magnetic sensing member is decreased.

6. The accelerometer according to one of claims 1 to 5,
   wherein the number of said at least one detecting unit is two so as to detect acceleration acting along two axis directions orthogonally intersecting each other.

7. The accelerometer according to one of claims 1 to 5,
   wherein the number of said at least one detecting unit is three so as to detect acceleration acting along three axis directions orthogonally intersecting each other.

8. The accelerometer according to one of claims 1-5, further comprising an electrical circuit for controlling the magnetic detecting head portion and the peripheral magnetic field detecting portion.

9. The accelerometer according to claim 8,
wherein the electrical circuit is formed to receive a detection signal of the magnetic detecting head portion and a detection signal of the peripheral magnetic field detecting portion provided corresponding to the magnetic detecting head portion so as to perform signal processing.

10. The accelerometer according to one of claims 1-5, wherein the accelerometer is modularized.

11. The accelerometer according to one of claims 1-5, wherein said at least one detecting unit further comprises at least one stopper provided in the rotation direction of the free end of the cantilever in order to prevent excessive displacement thereof.

12. The accelerometer according to claim 11,
wherein the said at least one stopper is integrated with the support member.

13. An acceleration sensing part for converting acting acceleration into a change in magnetic field, comprising:
a cantilever which is elastically deformed to rotate around a fixed end thereof,
a magnet body provided at a free end of the cantilever;
a support member fixing and supporting the fixed end of the cantilever, and
a multiple metal-layer provided between the support member and the fixed end of the cantilever,
wherein the change in magnetic field is caused by displacement of the magnet body,
the support member has a base portion bonded to the fixed end via the multiple metal-layer and an extending portion extending from the base portion to a free end side of the cantilever, and
the cantilever and the extending portion form a space therebetween.

14. The acceleration sensing part according to claim 13,
wherein the cantilever is a conductor, the support member has a conductive layer on a surface of the extending portion facing the cantilever, and the conductive layer is electrically connected to the cantilever.

15. The acceleration sensing part according to claim 13 or 14,
wherein the cantilever comprises a Ni-P alloy.

16. The acceleration sensing part according to claim 15,
wherein the support member comprises a ceramic.

17. The acceleration sensing part according to claim 13,
wherein the multiple metal-layer has a first metal layer adjacent to the support member and a second metal layer adjacent to the cantilever,
the first metal layer comprises at least one of Ti, Cr, and Al, and
the second metal layer comprises at least one of Cu, Au, and Ag.

18. The acceleration sensing part according to claim 15,
wherein the magnet body comprises a resin magnet or comprises a magnet and a resin layer which is to be bonded to the cantilever, further comprising a metal layer forming a stable passivation film to be bonded to the magnet body.

19. The acceleration sensing part according to claim 18,
wherein the metal layer comprises at least one of Cr, Al, Zn, and Ti.

* * * * *